US010862640B2

(12) United States Patent
Akula et al.

(10) Patent No.: US 10,862,640 B2
(45) Date of Patent: Dec. 8, 2020

(54) DYNAMIC TRANSIENT PERIOD CONFIGURATIONS FOR SHORTENED TRANSMISSION TIME INTERVALS

(71) Applicant: QUALCOMM Incorporated, San Diego, CA (US)

(72) Inventors: Prashanth Akula, Lake Bluff, IL (US); Seyedkianoush Hosseini, San Diego, CA (US); Wanshi Chen, San Diego, CA (US); Amir Farajidana, Sunnyvale, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/922,616

(22) Filed: Mar. 15, 2018

(65) Prior Publication Data

US 2018/0278393 A1  Sep. 27, 2018

Related U.S. Application Data

(60) Provisional application No. 62/476,485, filed on Mar. 24, 2017.

(51) Int. Cl.
*H04W 72/04* (2009.01)
*H04L 5/00* (2006.01)
(Continued)

(52) U.S. Cl.
CPC .......... *H04L 5/0048* (2013.01); *H04L 5/0051* (2013.01); *H04L 5/0064* (2013.01);
(Continued)

(58) Field of Classification Search
CPC ... H04L 5/0048; H04L 5/0051; H04L 5/0087; H04L 5/0064; H04L 1/0003;
(Continued)

(56) References Cited

U.S. PATENT DOCUMENTS

2010/0098008 A1* 4/2010 Ishii ..................... H04W 72/06
370/329
2013/0114505 A1* 5/2013 Haim .................. H04W 52/146
370/328
(Continued)

FOREIGN PATENT DOCUMENTS

| WO | WO-2018027540 A1 |   | 2/2018 |
| WO | WO-2018143882 A1 | * | 8/2018 |
| WO | WO2018143882 |   * | 8/2019 |

OTHER PUBLICATIONS

Ericsson, Further discussions on implication of On/Off mask on sTTI operations, 3GPP TSG-RAN WG4 Meeting #82, R4-1701629, Athens,Greece, Feb. 13-17, 2017, pp. 1-5 (Year: 2017).*
(Continued)

*Primary Examiner* — Un C Cho
*Assistant Examiner* — Lalita W Pace
(74) *Attorney, Agent, or Firm* — Qualcomm Incorporated

(57) ABSTRACT

Methods, systems, and devices for wireless communication are described that support dynamic transient period configurations for shortened transmission time intervals (sTTIs). A transient period may be configured within uplink transmissions such that protection is enabled for reference signals and data. For example, a user equipment (UE) may receive a resource grant from a base station for an uplink transmission, where the uplink transmission includes at least a first reference signal and a transmission time interval (TTI) that includes data and a second reference signal. The UE may identify a type of the reference signals and data, and may determine a priority based on the identified types of reference signals and data. The UE may then configure a transient period that overlaps with the first reference signal, the TTI, or both, based on the priority.

53 Claims, 17 Drawing Sheets

(51) Int. Cl.
*H04W 72/12* (2009.01)
*H04W 72/14* (2009.01)
*H04L 1/00* (2006.01)

(52) U.S. Cl.
CPC ....... *H04L 5/0087* (2013.01); *H04W 72/0413* (2013.01); *H04W 72/1242* (2013.01); *H04L 1/0003* (2013.01); *H04W 72/0446* (2013.01); *H04W 72/14* (2013.01)

(58) Field of Classification Search
CPC ......... H04W 72/1242; H04W 72/0413; H04W 72/14; H04W 72/0446
See application file for complete search history.

(56) References Cited

U.S. PATENT DOCUMENTS

| | | | | |
|---|---|---|---|---|
| 2013/0272230 | A1* | 10/2013 | Dinan | H04W 52/18 |
| | | | | 370/329 |
| 2014/0241242 | A1* | 8/2014 | Josiam | H04W 88/02 |
| | | | | 370/328 |
| 2014/0376471 | A1* | 12/2014 | Nishio | H04W 52/367 |
| | | | | 370/329 |
| 2015/0031410 | A1* | 1/2015 | Lim | H04W 52/146 |
| | | | | 455/522 |
| 2017/0272299 | A1* | 9/2017 | Chae | H04L 27/2662 |
| 2017/0302419 | A1* | 10/2017 | Liu | H04W 48/12 |
| 2018/0192321 | A1* | 7/2018 | Sahlin | H04L 5/0005 |
| 2019/0013912 | A1* | 1/2019 | Tomeba | H04B 7/04 |
| 2019/0037554 | A1* | 1/2019 | Gao | H04L 5/0051 |
| 2019/0081744 | A1* | 3/2019 | Yang | H04L 5/00 |
| 2019/0297572 | A1* | 9/2019 | Rahman | H04W 52/36 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 14)." 3GPP Standard; 3GPP TS 36.101, 3rd Generation Partnership Project (3GPP), Mobile Competence Centre; 650, Route Des Lucioles; F-06921, Sophia-Antipolis Cedex; France, vol. RAN WG4, No. V14.0.0, Jul. 8, 2016 (Jul. 8, 2016), pp. 23-303, XP051123151, [retrieved on Jul. 8, 2016].

Ericsson., "Further Discussions on Implication of On/Off Mask on sTTI Operations," 3GPP Draft; R4-1701629, Implication of On/Off Mask on UE RF REQ V2, 3rd Generation Partnership Project (3GPP), Mobile Competence Centre, 658, Route Des Lucioles, F-06921, Sophia-Antipolis Cedex, France, vol. RAN WG4, No. Athens, Greece; 20170213-20170217, Feb. 12, 2017 (Feb. 12, 2017), XP051214617, 5 pages, Retrieved from the Internet: URL: http://www.3gpp.org/ftp/Meetings_3GPP_SYNC/RAN4/Docs/ [retrieved on Feb. 12, 2017].

International Search Report and Written Opinion—PCT/US2018/022899—ISA/EPO—dated Jun. 13, 2018.

Qualcomm., et al., "WF: UE On/Off mask for sTTI," 3GPP Draft; R4-1702507, WF UE On-Off Mask for sTTI, 3rd Generation Partnership Project (3GPP), Mobile Competence Centre; 650, Route Des Lucioles; F-06921, Sophia-Antipolis Cedex; France, vol. RAN WG4, Athens, Greece; 20170213-20170217, Feb. 21, 2017 (Feb. 21, 2017), XP051238207, 7 pages, Retrieved from the Internet: URL: http://www.3gpp.org/ftp/tsg_ran/WG4_Radio/TSGR4_82/Docs/ [retrieved on Feb. 21, 2017].

Qualcomm Incorporate., "On-Off Time Mask for sTTI," 3GPP Draft; R4-1700449, sTTI On-Off Time Mask, 3rd Generation Partnership Project (3GPP), Mobile Competence Centre; 650, Route Des Lucioles; F-06921, Sophia-Antipolis Cedex; France, vol. RAN WG4, Athens. Greece; 20170213-20170217, Feb. 12, 2017 (Feb. 12, 2017), XP051213633, 4 pages, Retrieved from the Internet: URL: http://www.3gpp.org/ftp/Meetings_3GPP_SYNC/RAN4/Docs/ [retrieved on Feb. 12, 2017].

Ericsson, Huawei: "WWF on UE on/Off mask for sTTI operation," 3GPP TSG-RAN WG4 Meeting #81, R4-1610789, Reno, USA Nov. 14-18, 2016, pp. 1-8.

* cited by examiner

DYNAMIC TRANSIENT PERIOD CONFIGURATIONS FOR SHORTENED TRANSMISSION TIME INTERVALS

CROSS REFERENCES

The present application for patent claims priority to U.S. Provisional Patent Application No. 62/476,485 by Akula, et al., entitled "Dynamic Transient Period Configurations for Shortened Transmission Time Intervals," filed Mar. 24, 2017, assigned to the assignee hereof, and hereby expressly incorporated by reference herein in its entirety.

INTRODUCTION

The following relates generally to wireless communication, and more specifically to dynamic transient period configurations for shortened transmission time intervals (sTTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station in some LTE or NR deployments may transmit to one or more UEs using different length transmission time intervals (TTIs). In some cases, these TTIs may be reduced in length relative to legacy LTE TTIs. Such a reduced length transmission time interval (TTI) may be referred to as a shortened TTI (sTTI), and users communicating using sTTIs may be referred to as low latency users. An sTTI may be a subset of one or more longer duration TTIs that correspond to legacy subframes—e.g., the longer duration TTI may have a numerology that is based on a standardized radio access technology (RAT), such as LTE. A base station may allocate transmission resources for sTTIs to a UE that may include time resources, frequency resources, and one or more component carriers (CCs) to be used for sTTI transmissions. Efficient use of such resources for data, control information, and reference signal transmissions may help to increase the efficiency of a wireless communications system.

SUMMARY

The described techniques relate to improved methods, systems, devices, or apparatuses that support dynamic transient period configurations for sTTIs.

A method of wireless communication is described. The method may include identifying a resource grant for an uplink transmission, the uplink transmission comprising a first reference signal (RS) and a transmission time interval (TTI) that includes at least a second RS and data, identifying a type of the first RS, a type of the second RS, and a type of the data, determining a priority associated with the first RS, the second RS, and the data based at least in part on the type of the first RS, the type of the second RS, and the type of the data, dynamically configuring a transient period that overlaps with the first RS, or the TTI, or both based at least in part on the determined priority, and transmitting the uplink transmission comprising the configured transient period.

An apparatus for wireless communication is described. The apparatus may include means for identifying a resource grant for an uplink transmission, the uplink transmission comprising a first RS and a TTI that includes at least a second RS and data, means for identifying a type of the first RS, a type of the second RS, and a type of the data, means for determining a priority associated with the first RS, the second RS, and the data based at least in part on the type of the first RS, the type of the second RS, and the type of the data, means for dynamically configuring a transient period that overlaps with the first RS, or the TTI, or both based at least in part on the determined priority, and means for transmitting the uplink transmission comprising the configured transient period.

Another apparatus for wireless communication is described. The apparatus may include a processor, memory in electronic communication with the processor, and instructions stored in the memory. The instructions may be operable to cause the processor to identify a resource grant for an uplink transmission, the uplink transmission comprising a first RS and a TTI that includes at least a second RS and data, identify a type of the first RS, a type of the second RS, and a type of the data, determine a priority associated with the first RS, the second RS, and the data based at least in part on the type of the first RS, the type of the second RS, and the type of the data, dynamically configure a transient period that overlaps with the first RS, or the TTI, or both based at least in part on the determined priority, and transmit the uplink transmission comprising the configured transient period.

A non-transitory computer readable medium for wireless communication is described. The non-transitory computer-readable medium may include instructions operable to cause a processor to identify a resource grant for an uplink transmission, the uplink transmission comprising a first RS and a TTI that includes at least a second RS and data, identify a type of the first RS, a type of the second RS, and a type of the data, determine a priority associated with the first RS, the second RS, and the data based at least in part on the type of the first RS, the type of the second RS, and the type of the data, dynamically configure a transient period that overlaps with the first RS, or the TTI, or both based at least in part on the determined priority, and transmit the uplink transmission comprising the configured transient period.

Some examples of the method, apparatus, and non-transitory computer-readable medium described above may further include processes, features, means, or instructions for determining that the first RS may be adjacent to the second RS within the uplink transmission. In some examples of the method, apparatus, and non-transitory computer-readable medium described above, the transient period may be configured to overlap with the first RS and the second RS based at least in part on the determination that the first RS is adjacent to the second RS. In some examples of the method, apparatus, and non-transitory computer-readable medium described above, the transient period may be configured to overlap with the second RS based at least in part on the determination that the first RS is adjacent to the second RS.

Some examples of the method, apparatus, and non-transitory computer-readable medium described above may further include processes, features, means, or instructions for determining that the first RS may be adjacent to the data of the TTI within the uplink transmission. In some examples of the method, apparatus, and non-transitory computer-readable medium described above, the transient period may be configured to overlap with the data based at least in part on the determination that the first RS is adjacent to the data. In some examples of the method, apparatus, and non-transitory computer-readable medium described above, the transient period may be configured to overlap with the first RS based at least in part on the determination that the first RS is adjacent to the data. In some examples of the method, apparatus, and non-transitory computer-readable medium described above, the transient period may be configured to overlap with the first RS and the data based at least in part on the determination that the first RS is adjacent to the data.

In some examples of the method, apparatus, and non-transitory computer-readable medium described above, identifying the type of the first RS comprises: identifying a periodicity of the RS based at least in part on an uplink configuration of the uplink transmission. In some examples of the method, apparatus, and non-transitory computer-readable medium described above, identifying the type of the data comprises: identifying a modulation and coding scheme (MCS) associated with the data, or a content of the data, or both. In some examples of the method, apparatus, and non-transitory computer-readable medium described above, the content of the data comprises an acknowledgment or a negative acknowledgment.

In some examples of the method, apparatus, and non-transitory computer-readable medium described above, the TTI or the first RS may be associated with another wireless device. In some examples of the method, apparatus, and non-transitory computer-readable medium described above, the first RS comprises a sounding reference signal (SRS). In some examples of the method, apparatus, and non-transitory computer-readable medium described above, the second RS comprises a demodulation reference signal (DMRS).

DETAILED DESCRIPTION

Improved methods, systems, devices, or apparatuses of various examples may be used to support time mask techniques for sTTIs that may enhance low latency communications. Resources allocated for low latency communication may be used for uplink and downlink communication using sTTIs that have a reduced length relative to TTIs of communications that may be relatively latency insensitive, such as enhanced mobile broadband (eMBB) transmissions that may use a 1 millisecond (ms) TTI duration. Communications using sTTIs may use, in some cases, an sTTI duration that corresponds to one slot of a wireless subframe, or an sTTI duration that corresponds to two or three orthogonal frequency division multiplexing (OFDM) symbols. In some cases, sTTIs may be configured to have boundaries within or aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Various techniques described herein may provide for identifying characteristics of a transmission (e.g., power changes, resource block (RB) allocation changes, etc.) and dynamically determining a location of a transient region (e.g., a time mask) for transmissions that use sTTIs in a manner that provides increased protection of error-sensitive portions of the transmission. The present disclosure describes various techniques with reference to next generation networks (e.g., 5G or NR networks) that are being designed to support features such as high bandwidth operations, more dynamic subframe/slot types, and self-contained subframe/slot types (in which hybrid automatic repeat request (HARD) feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Various examples of transient periods and time masks for different TTIs are then discussed. Aspects of the disclosure are further illustrated by and described with reference to apparatus diagrams, system diagrams, and flowcharts that relate to time mask techniques for sTTIs.

Figure 1:
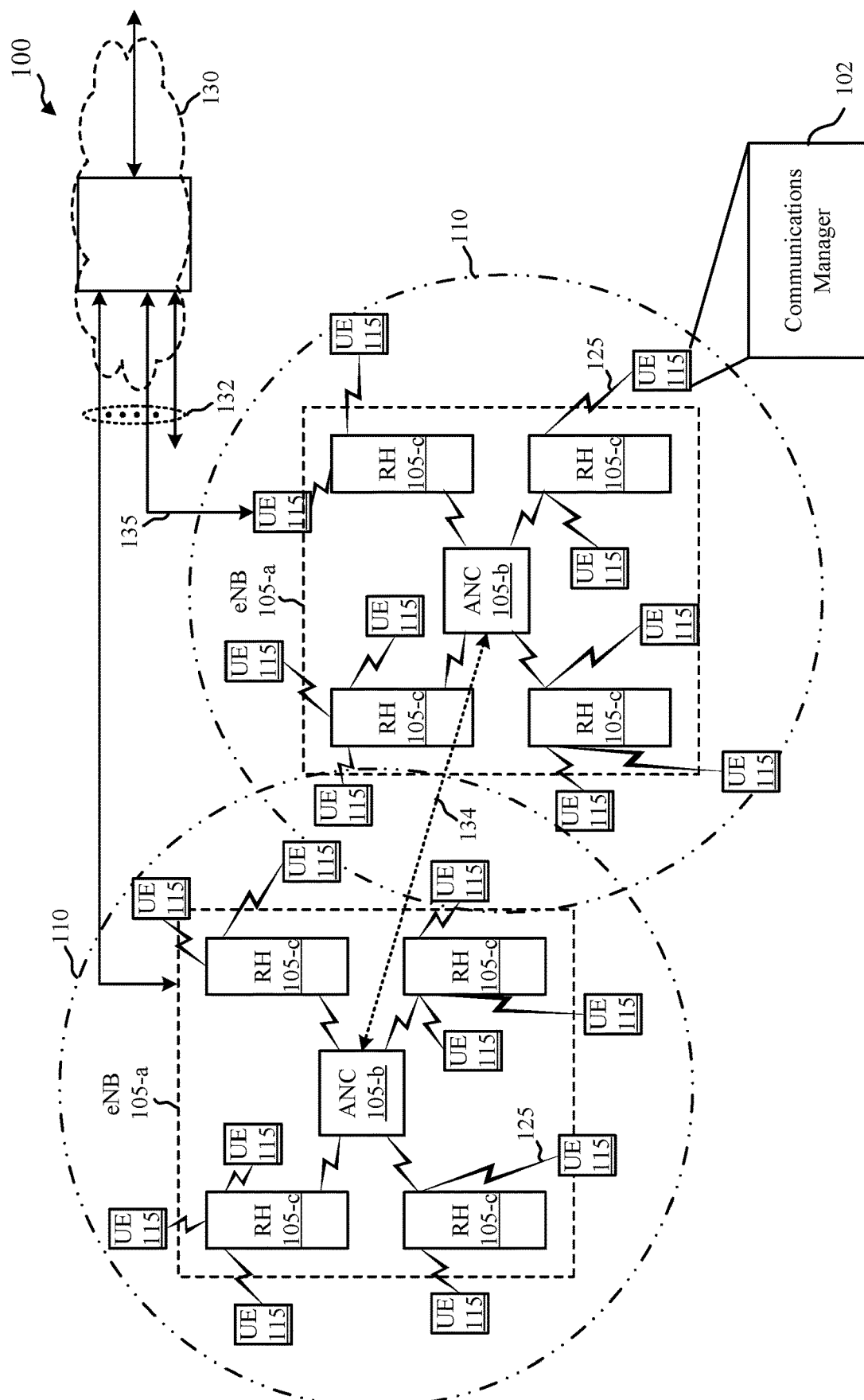
FIG. 1 illustrates an example of a system for wireless communication that supports dynamic transient period configurations for sTTIs in accordance with one or more aspects of the present disclosure.

FIG. 1 illustrates an example of a wireless communications system 100 in accordance with various aspects of the present disclosure. The wireless communications system 100 may include base stations 105 (e.g., network access devices, gNodeBs (gNBs), and/or radio heads (RHs)), UEs 115, and a core network 130. In some examples, the wireless communications system 100 may be a LTE (or LTE-Advanced) network, or a NR network. In some cases, wireless communications system 100 may support enhanced broadband communications, ultra-reliable (i.e., mission critical) communications, low latency communications, and communications with low-cost and low-complexity devices.

The core network 130 may provide user authentication, access authorization, tracking, Internet Protocol (IP) connectivity, and other access, routing, or mobility functions. At least some of the base stations 105 (e.g., eNodeBs (eNBs)

105-a or access node controllers (ANCs) 105-b, gNBs) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each access node controller (ANC) 105-b may also communicate with a number of UEs 115 through a number of smart radio heads (radio heads) 105-c. In an alternative configuration of the wireless communications system 100, the functionality of an ANC 105-b may be provided by a radio head 105-c or distributed across the radio heads 105-c of an eNB 105-a. In another alternative configuration of the wireless communications system 100, the radio heads 105-c may be replaced with base stations, and the ANCs 105-b may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communications system 100 may include radio heads 105-c (or base stations 105 or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE 115 may be able to communicate with various types of eNBs 105-a, radio heads 105-c, base stations 105, access points, or other network access devices, including macro eNBs, small cell eNBs, relay base stations, and the like. A UE may also be able to communicate directly with other UEs 115 (e.g., using a peer-to-peer (P2P) protocol). In some cases, a UE 115 may communicate with core network 130 through communication link 135.

In some examples, the wireless communications system 100 may include a 5G network. In other examples, the wireless communications system 100 may include an LTE/LTE-A network. The wireless communications system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. Transmissions over communication links 125 may be encoded according to a modulation and coding scheme (MCS), which may contribute to the data rate for a given transmission. For example, when channel conditions are good (e.g., little interference), a high MCS may be employed such that an increased amount of information may be conveyed in a given time period relative to a lower MCS.

In some cases, a UE 115 may also be able to communicate directly with other UEs (e.g., using a peer-to-peer (P2P) or device-to-device (D2D) protocol). Some UEs 115, such as machine-type communications (MTC) or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an ANC.

UEs 115 may include a communications manager 102, which may identify a resource grant for an uplink transmission, the uplink transmission including a first RS and a TTI that includes at least a second RS and data, identify a type of the first RS, a type of the second RS, and a type of the data, determine a priority associated with the first RS, the second RS, and the data based on the type of the first RS, the type of the second RS, and the type of the data, dynamically configure a transient period that overlaps with the first RS, or the TTI, or both based on the determined priority, and transmit the uplink transmission including the configured transient period.

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices (e.g., gNBs, eNBs 105-a, ANCs 105-b, RHs 105-c) may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, and shorter TTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5-ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide transmission techniques for shortened TTIs, which may provide transient period time masks outside of a sTTI duration so as to provide sTTI transmissions with relatively small impacts from transients associated with powering on or powering off a transmitter or transients associated with other transmissions.

For example, a UE 115 may transmit a sounding reference signal (SRS) to help a base station 105 measure received signal power across a wide transmission bandwidth. The base station 105 may use the information gleaned from the SRS for frequency-dependent scheduling. In some cases, the UE 115 may transmit the SRS consecutively with a sTTI. Various techniques discussed herein may be employed to prevent clashes between the SRS and other transmissions of the UE 115. In some cases, the described techniques may allow for dynamic selection of transmission schemes (e.g., based on a MCS, a periodicity of the SRS transmission, etc.).

Figure 2:
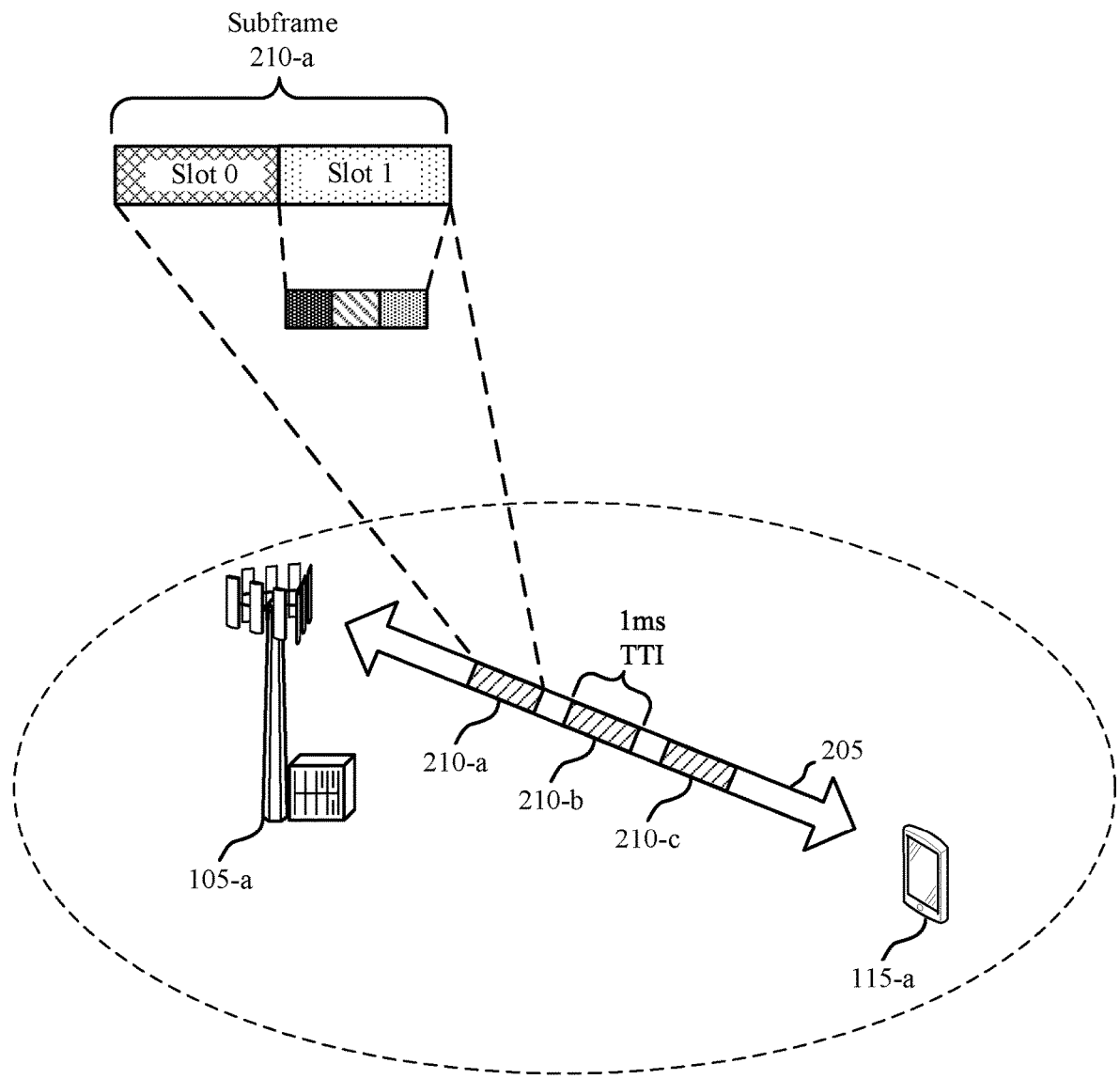
FIG. 2 illustrates an example of a wireless communications system that supports dynamic transient period configurations for sTTIs in accordance with one or more aspects of the present disclosure.
Figure 2:
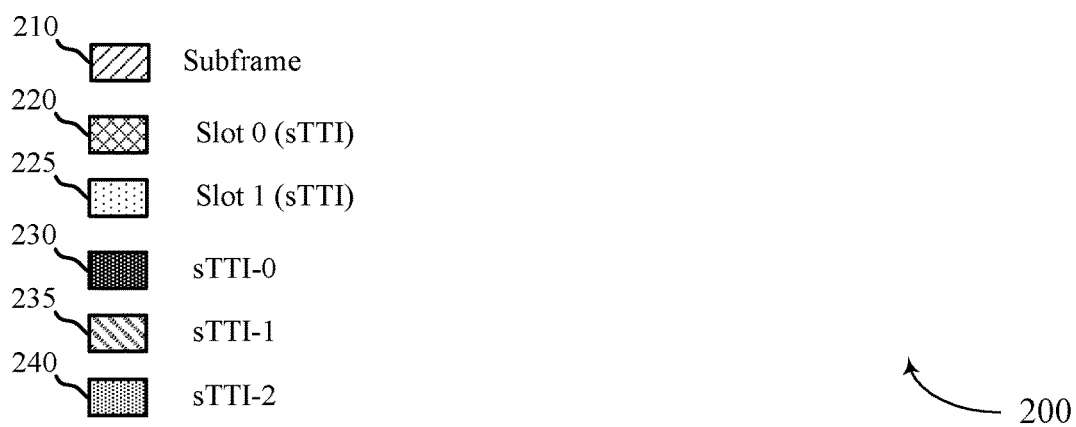

FIG. 2 illustrates an example of a wireless communications system 200 that supports one or more aspects of the present disclosure. Wireless communications system 200 includes base station 105-a and UE 115-a, which may be examples of aspects of the corresponding devices as described above with reference to FIG. 1. In the example of FIG. 2, the wireless communications system 200 may operate according to a RAT such as a 5G or NR, although techniques described herein may be applied to any RAT and to systems that may concurrently use two or more different RATs.

Base station 105-a may communicate with UE 115-a over carrier 205. In some examples, base station 105-a may allocate resources for communication with UEs 115 over carrier 205. For example, base station 105-a may allocate subframes 210 for communication with UE 115-a, and one or more subframes 210 may correspond to a legacy LTE TTI having a TTI length of 1 ms. In this example, subframes 210 may include a first subframe 210-a, a second subframe 210-b, and a third subframe 210-c. Each of the subframes 210 may include two slots, in which each slot may have seven symbols for a normal cyclic prefix. In this example, the first subframe 210-a may include resources for sTTI transmissions (e.g., for transmissions of a low latency service that uses sTTIs), and the second subframe 210-b may include resources for a 1 ms TTI (e.g., for a legacy LTE transmission or another transmission that uses 1 ms TTIs).

The first subframe 210-a of this example includes a first slot (slot 0) 220 and a second slot (slot 1) 225. As indicated above, in the uplink of a low latency system, different sTTI lengths may be used for transmissions over carrier 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration.

When a two-symbol or three-symbol sTTI is used, in some cases it may be desirable to have a fixed sTTI structure in which sTTI boundaries lie within slot boundaries or are aligned with slot boundaries, such as the boundaries of the first slot 220 or second slot 225, which may be referred to as slot-aligned sTTIs. As discussed above, when using a normal CP, seven symbols are included in each slot 220, 225, and each slot may thus include three sTTIs for slot-aligned sTTIs.

As discussed herein, time masks may be applied differently for sTTIs that are transmitted consecutively with SRS. In some wireless communications systems (e.g., LTE), the transient region when SRS and PUSCH are transmitted consecutively (e.g., within the same TTI) may occur completely within the PUSCH portion of a TTI (e.g., subframe 210-b or a 1 ms TTI). Accordingly, the SRS may be referred to as completely protected. That is, the SRS may have a higher likelihood of being successfully received at a receiver (e.g., a base station 105) than the PUSCH portions of the TTI that overlap with the transient period(s). However, because of the shorter duration of an sTTI, such an implementation may be problematic. For example, in some deployments in which a 1 ms TTI is used, a transient time of 20 microseconds (µs) may be present for an ON-OFF or OFF-ON transition. Having such a transient period within the 1 ms TTI may result in up to 2% of the 1 ms TTI duration being impacted by these transient periods. However, when a transmitter is transmitting sTTIs, the impact of such a transient period may be greater. For example, if a 2-symbol sTTI is being used, having a 20 µs transient period present may result in greater than 10% of the sTTI duration being impacted by such a transient period. These durations are used for example purposes only, and other transient period durations are also considered.

In aspects of the present disclosure, time masks for transient periods may be applied (e.g., dynamically) to ensure that such transient periods occur outside of a duration of an sTTI or an SRS (e.g., depending on the sensitivity of the information in each region or some such factor). That is, the content of an sTTI may be taken into consideration such that the transient period only impacts certain portions of a transmission, which may be coherently determined by the transmitting device. In such cases, the impact of transient periods on sTTI and/or SRS transmissions may be reduced, which may increase the likelihood of successful reception of the sTTIs and/or SRS at a receiver.

As described below, a variety of factors may be considered when determining the time mask (e.g., which may alternatively be referred to as a power mask herein). For example, if a demodulation reference signal (DMRS) portion of a PUSCH transmission within an sTTI is next to (e.g., adjacent in time) SRS, there may be multiple options for determining the time mask, and a UE 115 may be able to dynamically select between these options based on one or more of the factors discussed below. For example, in some cases, a UE 115 may be configured to always protect the DMRS (i.e., such that the transient period occurs within the SRS transmission, which may represent a single OFDM symbol). In some cases, the UE 115 may additionally or alternatively be configured to protect an aperiodic SRS transmission (i.e., such that the transient period may occur within the DMRS and/or data portion of the PUSCH sTTI). In another example, for periodic SRS transmissions, transient times may be accommodated within the SRS symbol (e.g., because the periodicity of such SRS transmissions may make them more robust to transmission errors associated with the transient region). Generally, the power mask may be tailored for each specific case depending on the SRS type (e.g., periodic or aperiodic), MCS of the data region, or some other similar factors. Further, in some cases, adjacent symbols may share the overall transient time to balance the negative effect of the transient period.

In some examples, the time mask may be application dependent. For example, DMRS and data may be fully protected for ultra-reliable, low latency communications (URLLC). Additionally or alternatively, the mask may be split between DMRS and SRS for LTE ultra-low latency (ULL) communications. In various examples, a UE 115 may determine (e.g., from an uplink grant) whether it is scheduled for URLLC or ULL traffic such that the UE 115 may adapt the transient period (i.e., time mask) accordingly.

Cases are also considered in which SRS for one UE 115 is consecutive to an sTTI of a second UE 115. That is, the dynamic time masking techniques described herein may be applicable to scenarios in which consecutive SRS and PUSCH sTTIs are associated with the same UE 115 or with different UEs 115. For example, in a last sTTI of a subframe (e.g., a temporally last sTTI, such as sTTI 240 of subframe 210-a), a first UE 115 may send an SRS in the last symbol of the sTTI 240, while a second UE 115 may use the first two symbols of a subsequent subframe (e.g., subframe 210-b) for data/DMRS transmission.

Alternatively, in the case that the temporally last sTTI of the subframe (e.g., sTTI 240) is a 3-symbol sTTI, the transient time may be split between the SRS of the first UE 115 and the data symbol of the second UE 115 (e.g., because the DMRS is already protected). In such cases, the sTTI may include symbols used for DMRS, data, and another signal (e.g., including an SRS sent in a different sub-band, or by a different user) or null (e.g., no signals are send over the corresponding OFDM symbol). Additionally or alternatively, the time mask may be based on the content of the data symbol. For example, a data symbol carrying acknowledgement/negative acknowledgement (ACK/NACK) bits may be prioritized (e.g., protected) over DMRS and/or SRS. These examples may also apply to the case when an sTTI for a UE 115 is adjacent to a cell-specific SRS transmission opportunity (i.e., there is no SRS transmission by the UE 115, but other UEs 115 may transmit during the cell-specific SRS symbol).

Figure 3:
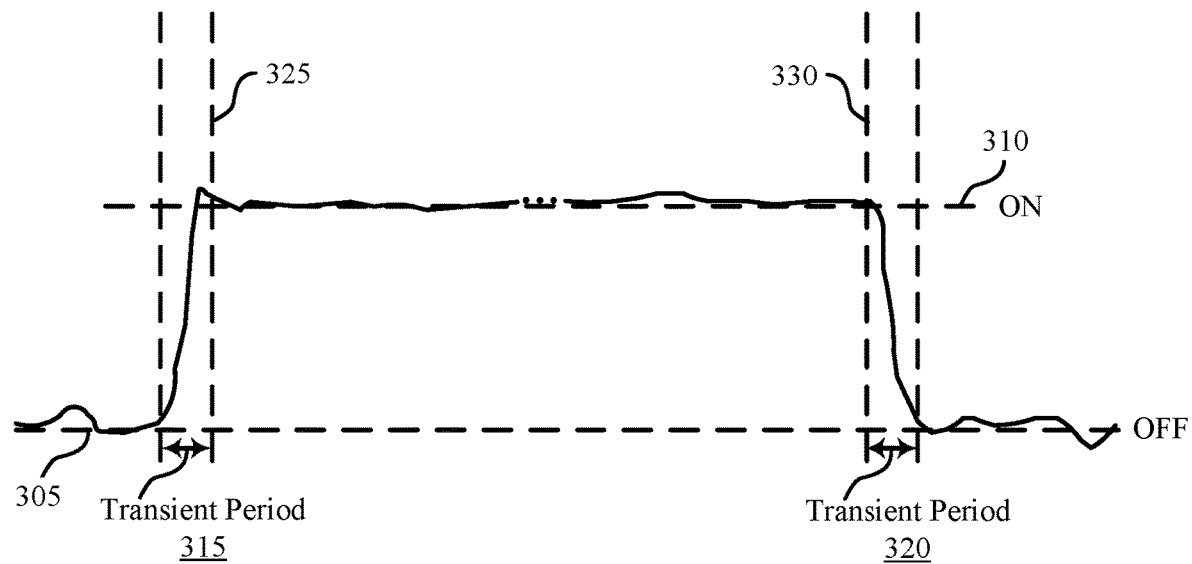
FIG. 3 illustrates an example of wireless resources that supports dynamic transient period configurations for sTTIs in accordance with one or more aspects of the present disclosure.

FIG. 3 illustrates an example of wireless resources 300, and OFF-ON transient and ON-OFF transient time masks. The wireless resources 300 may be used, for example, in sTTI transmissions for low latency communications between a UE 115 and a base station 105, such as discussed above with respect to FIGS. 1 and 2. In the example of FIG. 3, a transmitter power may change from an OFF-state with nominal off power level 305 to an ON-state with nominal on power level 310. A first transient period 315 may correspond to a period for the transmitter to switch from the off power level 305 to the on power level 310. A second transient period 320 may correspond to a period for the transmitter to switch from the on power level 310 to the off power level 305.

As described above, these transient periods may refer to regions in which transmission power and/or RB allocation changes (i.e., frequency hopping). Because SRS transmissions occur over a relatively wide bandwidth, juxtaposition of SRS and PUSCH transmissions may result in such transient regions. As further described above, transmissions that occur during such transient regions may be associated with a lower likelihood of successful reception. Accordingly, a device may be configured to use techniques described herein to format transmissions such that the negative effects of the transient region may be mitigated.

For example, and as indicated above, in some cases, transient periods may be masked to provide the transient periods outside of a duration of an error-sensitive portion of a transmission. In the example of FIG. 3, a start of a protected period 325 may correspond to the end of the first transient period 315. Correspondingly, the end of the protected period 330 may correspond to the start of the second transient period 320. In various examples described below, a UE 115 may be configured to transmit different types of signals (e.g., having different content) in the protected period, such that the signals (or regions of time/frequency resources) within the protected period may be relatively unaffected with regards to the first transient period 315 and the second transient period 320.

Figure 4A:
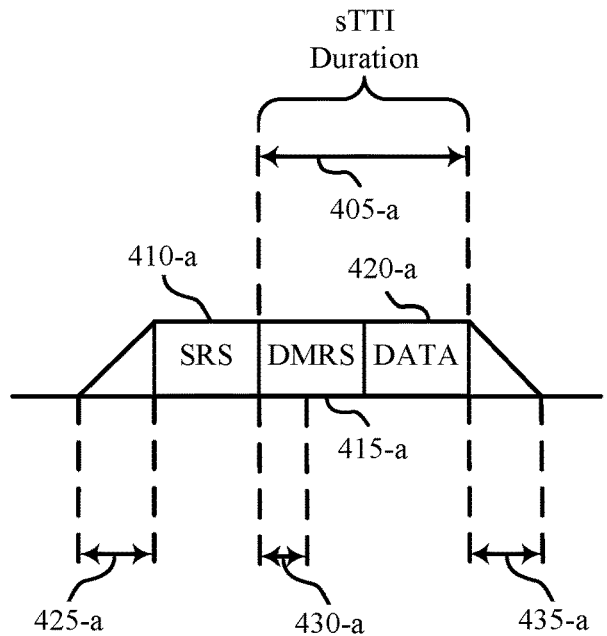
FIGS. 4A through 10 illustrate examples of time mask configurations that support dynamic transient period configurations for sTTIs in accordance with one or more aspects of the present disclosure.
Figure 4B:
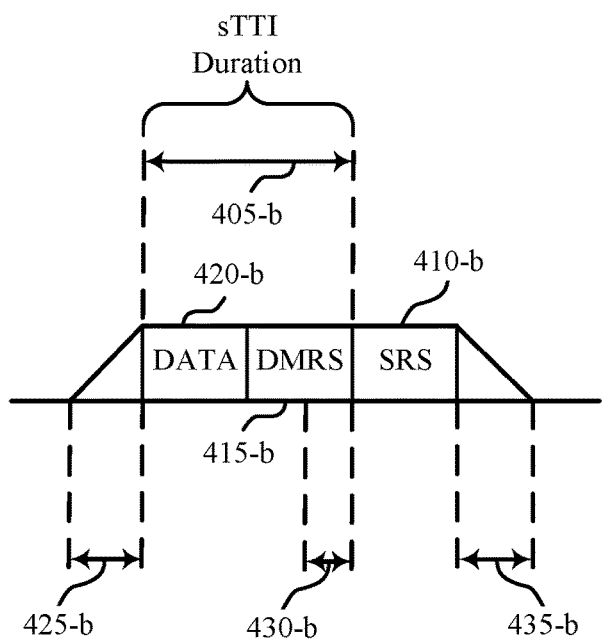

FIGS. 4A and 4B illustrate examples of respective time mask configurations 400 and 450 that support one or more aspects of the present disclosure. A UE 115 may be configured to dynamically select between these time mask configurations and the time mask configurations that follow based on a variety of factors that are discussed in various aspects of the present disclosure (e.g., MCS of the data, periodicity of the SRS, etc.).

Time mask configuration 400 illustrates an SRS symbol 410-*a* (e.g., which may or may not occur within an sTTI) that occurs immediately prior to an sTTI with duration 405-*a*. As illustrated, sTTI duration 405-*a* may be split into DMRS region 415-*a* (e.g., which may be an OFDM symbol) and DATA region 420-*a*. In some cases (e.g., as illustrated with reference to time mask configuration 450), the DATA region 420 may occur before the DMRS region 415 (e.g., such that the DMRS region 415 and the SRS region 410 are adjacent). The present example and examples that follow are illustrated with two-symbol sTTI durations, though it is to be understood that other durations (e.g., three symbols) are also considered.

Time mask configuration 400 additionally includes initial transient region 425-*a* and final transient region 435-*a*, which may be examples of first and second transient periods 315 and 320 described with reference to FIG. 3. Also illustrated in time mask configuration 400 is transient region 430-*a*, which may occur at the boundary of SRS region 410-*a* and DMRS region 415-*a* (e.g., because of the different power requirements and/or frequency resources of the respective regions). As illustrated, transient region 430-*a* may be contained entirely within DMRS region 415-*a*. For example, such a configuration may be employed when SRS region 410-*a* contains an aperiodic SRS and/or DATA region 420-*a* contains information that has been encoded with a high MCS (e.g., as compared to the MCS of other information).

With reference to FIG. 4B, time mask configuration 450 may resemble aspects of time mask configuration 400, except that SRS region 410-*b* may occur immediately after sTTI duration 405-*b*. The other components of time mask configuration 450 may be analogous to the corresponding features described with respect to time mask configuration 400.

Figure 5A:
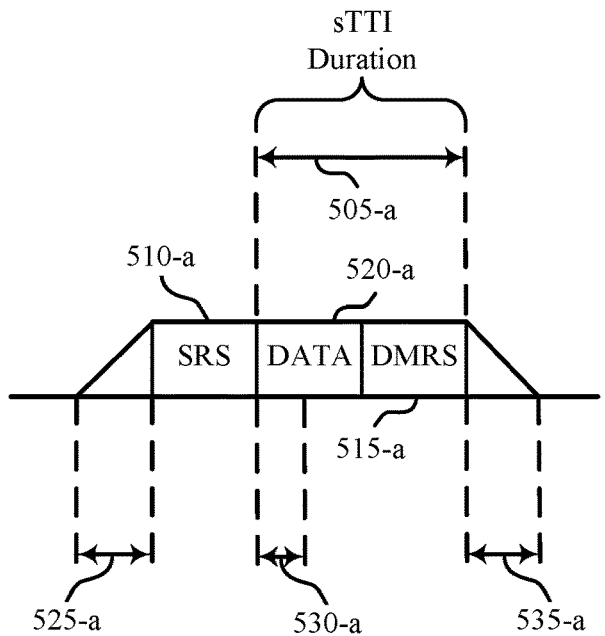
Figure 5B:
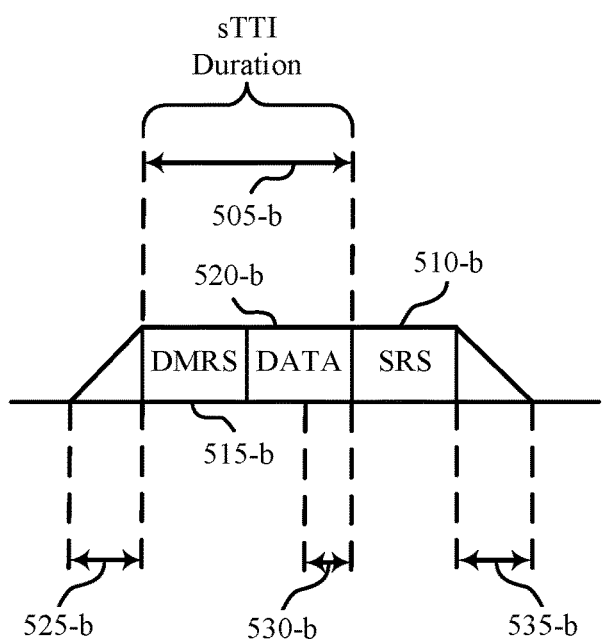

FIGS. 5A and 5B illustrate examples of respective time mask configurations 500 and 550 that support one or more aspects of the present disclosure. A UE 115 may be configured to dynamically select between these time mask configurations and other time mask configurations discussed herein based on a variety of factors (e.g., MCS of the data, periodicity of the SRS, etc.).

Time mask configuration 500 illustrates an SRS symbol 510-*a* (e.g., which may or may not occur within an sTTI) that occurs immediately prior to an sTTI with sTTI duration 505-*a*. As illustrated, sTTI duration 505-*a* may be split into DMRS region 515-*a* (e.g., which may be an OFDM symbol) and DATA region 520-*a*. In some cases (e.g., as illustrated with reference to time mask configuration 550), the DATA region 520 may occur after the DMRS region 515 (e.g., such that the DATA region 520 and SRS region 510 are adjacent).

Time mask configuration 500 additionally includes initial transient region 525-*a* and final transient region 535-*a*, which may be examples of first and second transient periods 315 and 320 as described with reference to FIG. 3. Also illustrated in time mask configuration 500 is transient region 530-*a*, which may occur at the boundary of SRS region 510-*a* and DATA region 520-*a* (e.g., because of the different power requirements and/or frequency resources of the respective regions). As illustrated, transient region 530-*a* may be contained entirely within DATA region 520-*a*. For example, such a configuration may be employed when SRS region 510-*a* contains an aperiodic SRS and/or DATA region 520-*a* contains information that has been encoded with a relatively low MCS (e.g., such that DMRS region 515-*a* and SRS region 510-*a* may be prioritized over DATA region 520-*a*).

With reference to FIG. 5B, time mask configuration 550 may resemble aspects of time mask configuration 500, except that SRS region 510-*b* may occur immediately after (subsequent to) sTTI duration 505-*b*. The other components of time mask configuration 550 may be analogous to the corresponding features described with respect to time mask configuration 500.

Figure 6A:
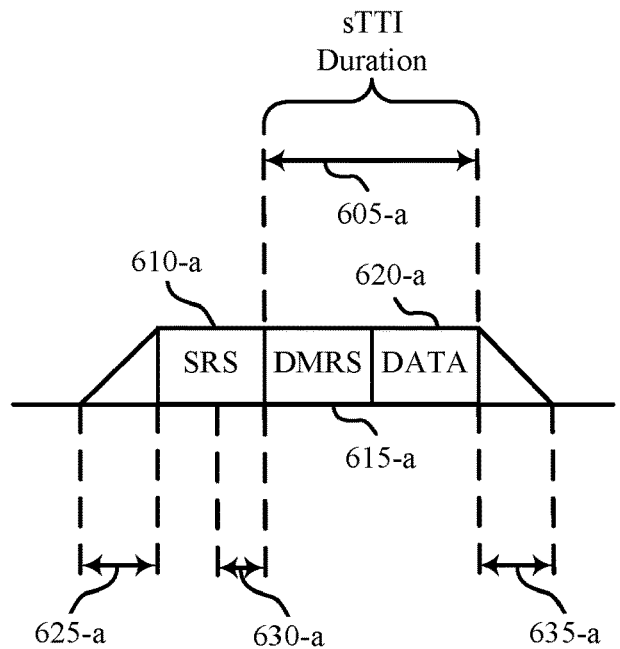
Figure 6B:
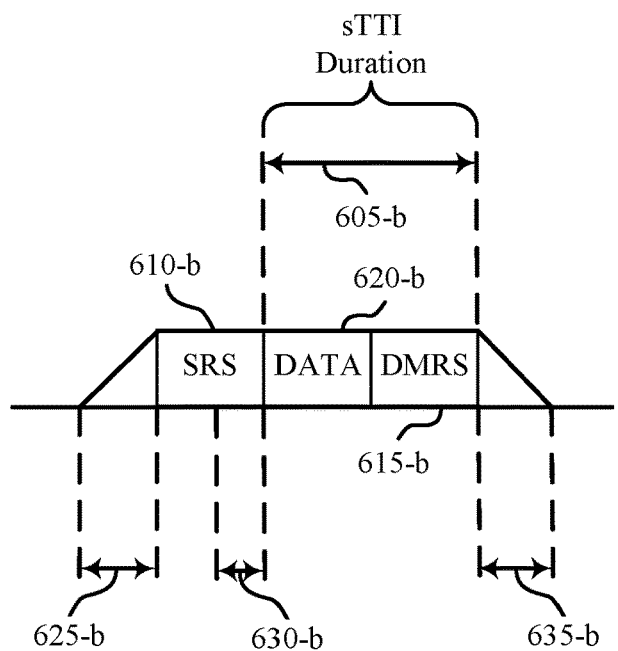

FIGS. 6A and 6B illustrate examples of respective time mask configurations 600 and 650 that support one or more aspects of the present disclosure. A UE 115 may be configured to dynamically select between these time mask configurations and other time mask configurations discussed herein based on a variety of factors (e.g., MCS of the data, periodicity of the SRS, etc.).

Time mask configuration 600 illustrates an SRS symbol 610-*a* (e.g., which may or may not occur within an sTTI) that occurs immediately prior to an sTTI with sTTI duration 605-*a*. As illustrated, sTTI duration 605-*a* may be split into DMRS region 615-*a* (e.g., which may be an OFDM symbol) and DATA region 620-*a*. In some cases (e.g., as illustrated with reference to time mask configuration 650), the DATA region 620 may occur before the DMRS region 615 within sTTI duration 605-*b*.

Time mask configuration 600 additionally includes initial transient region 625-*a* and final transient region 635-*a*, which may be examples of first and second transient periods 315 and 320 described with reference to FIG. 3. Also illustrated in time mask configuration 600 is transient region 630-*a*, which may occur at the boundary of SRS region 610-*a* and the sTTI with sTTI duration 605-*a* (e.g., because of the different power requirements and/or frequency resources of the respective regions). As illustrated, transient region 630-*a* may be contained entirely within SRS region 610-*a*. For example, such a configuration may be employed when SRS region 610-*a* contains a periodic SRS and/or DATA region 620-*a* contains information that has been encoded with a high MCS (e.g., such that DMRS region 615-*a* and DATA region 620-*a* may be prioritized over SRS region 610-*a*).

With reference to FIG. 6B, time mask configuration 650 may resemble aspects of time mask configuration 600, except that DATA region 620-*b* may occur before DMRS region 615-*b*. The other components of time mask configuration 650 may be analogous to the corresponding features described with respect to time mask configuration 600.

Figure 7A:
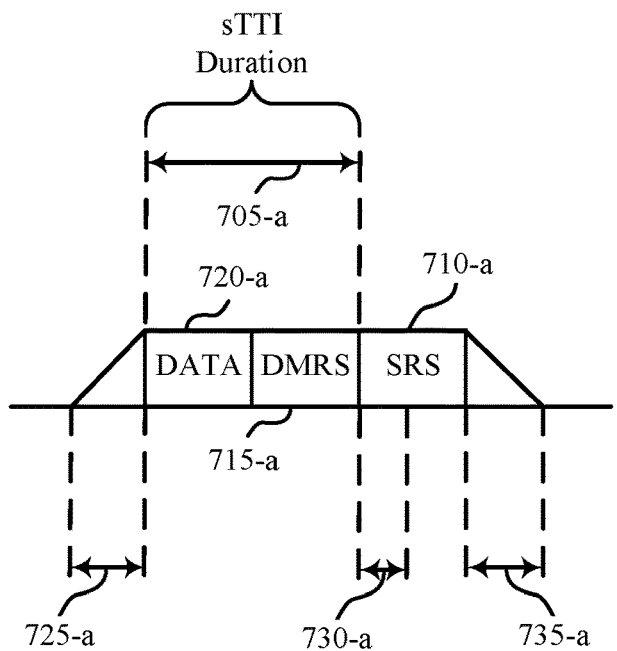
Figure 7B:
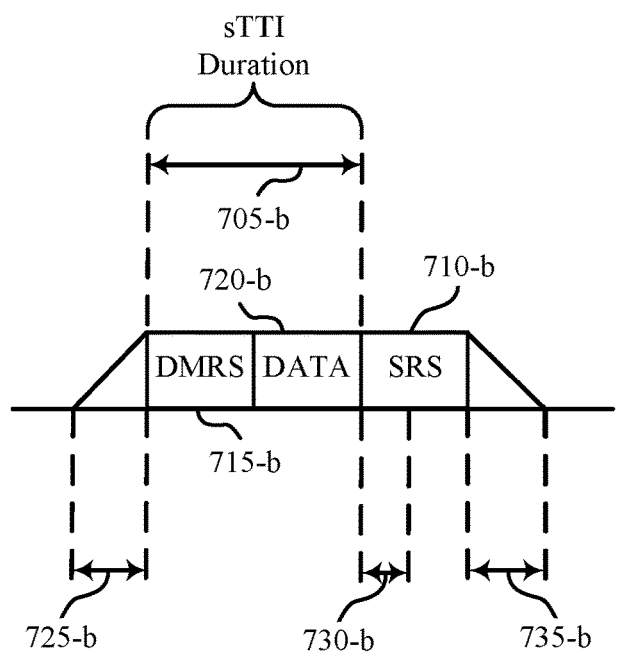

FIGS. 7A and 7B illustrate examples of respective time mask configurations 700 and 750 that support one or more aspects of the present disclosure. A UE 115 may be configured to dynamically select between these time mask configurations and other time mask configurations discussed herein based on a variety of factors (e.g., MCS of the data, periodicity of the SRS, etc.).

Time mask configuration 700 resembles aspects of time mask configuration 600 as described with reference to FIG. 6A, except that SRS region 710-*a* occurs after the sTTI with duration 705-*a* in the present example. However, as illustrated, SRS region 710-*a* and DMRS region 715-*a* are still adjacent in the present example. Similarly, time mask configuration 750 resembles aspects of time mask configuration 650 as described with reference to FIG. 6BA, except that SRS region 710-*b* occurs after the sTTI with duration 705-*b* in the present example. However, as illustrated, SRS region 710-*b* and DATA region 720-*b* are still adjacent in the present example. The various components of time mask configurations 700, 750 may otherwise be analogous to the corresponding components described with reference to time mask configurations 600, 650. As described above, such a time mask configuration (e.g., in which the transient region 730 occurs within the SRS region 710), may be employed when SRS region 710 contains a periodic SRS and/or DATA region 720 contains information that has been encoded with a high MCS (e.g., such that DMRS region 715 and DATA region 720 may be prioritized over SRS region 710).

Figure 8A:
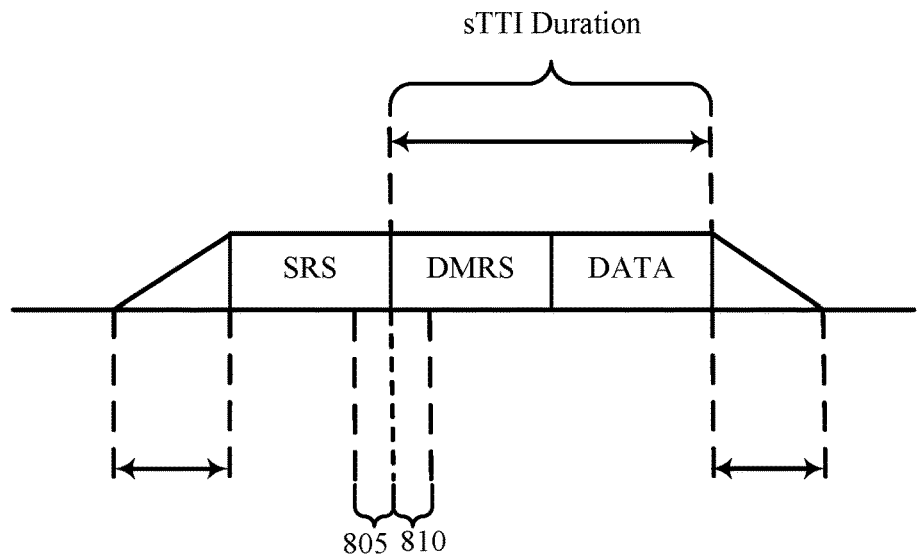
Figure 8B:
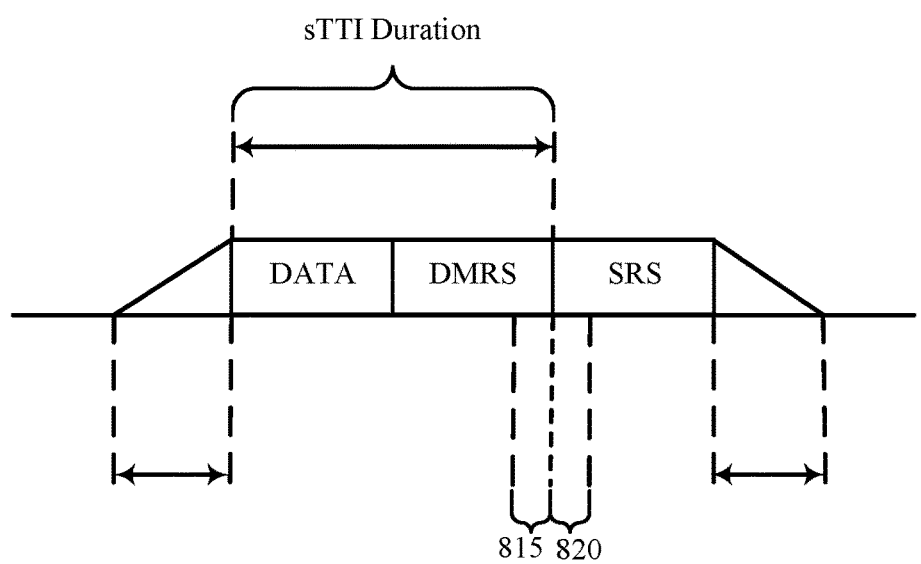

FIGS. 8A and 8B illustrate examples of respective time mask configurations 800 and 850 that support one or more aspects of the present disclosure. A UE 115 may be configured to dynamically select between these time mask configurations and other time mask configurations discussed herein based on a variety of factors (e.g., MCS of the data, periodicity of the SRS, etc.).

Time mask configurations 800, 850 resemble time mask configurations 400, 450, respectively, described above with reference to FIGS. 4A and 4B. However, in accordance with various aspects of the present disclosure, the transient region that occurs at the boundary of the SRS region and DMRS region in the present example may be shared between the two regions (e.g., such that an initial transient portion 805 occurs within the SRS region and a second transient portion 810 occurs within the DMRS region). Splitting the transient region between the SRS region and DMRS region may reduce the negative impact of the transient region (e.g., in a case in which neither the SRS region nor the DMRS region is prioritized over the other).

Time mask configuration 850 resembles time mask configuration 800, except that the SRS region occurs after the DMRS region (i.e., such that the two are still adjacent). As illustrated and explained above with reference to time mask configuration 800, the transient region may be divided into a first transient portion 815 and a second transient portion 820. These transient portions may be equal in duration; however other duration segmentations are also considered (i.e., such that the duration of first transient portion 815 and second transient portion 820 may not be equal in all cases).

Figure 9:
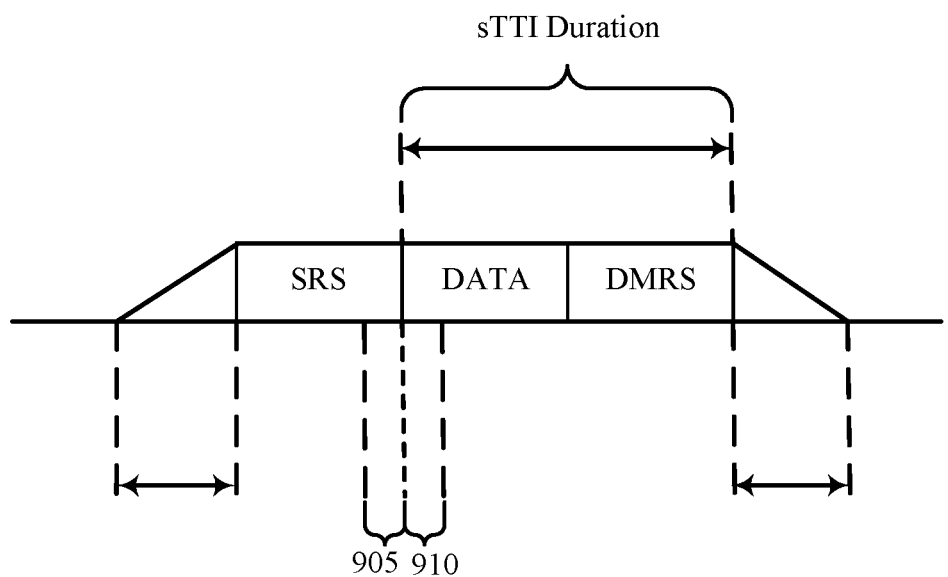

FIG. 9 illustrates an example of a time mask configuration 900 that supports one or more aspects of the present disclosure. A UE 115 may be configured to dynamically select between this time mask configuration and other time mask configurations discussed herein based on a variety of factors (e.g., MCS of the data, periodicity of the SRS, etc.).

Time mask configuration 900 resembles aspects of time mask configuration 800 described with reference to FIG. 8A. However, while time mask configuration 800 segmented the transient period between an SRS region and a DMRS region, time mask configuration 900 illustrates a similar segmentation between an SRS region and a DATA region. Accordingly, first transient portion 905 occurs within the SRS region and second transient portion 910 occurs within the DATA region. For example, such a time mask configuration may be employed when the DMRS region is prioritized over the DATA region and SRS region, but there is no substantive prioritization between the DATA regions and SRS regions themselves.

Figure 10:
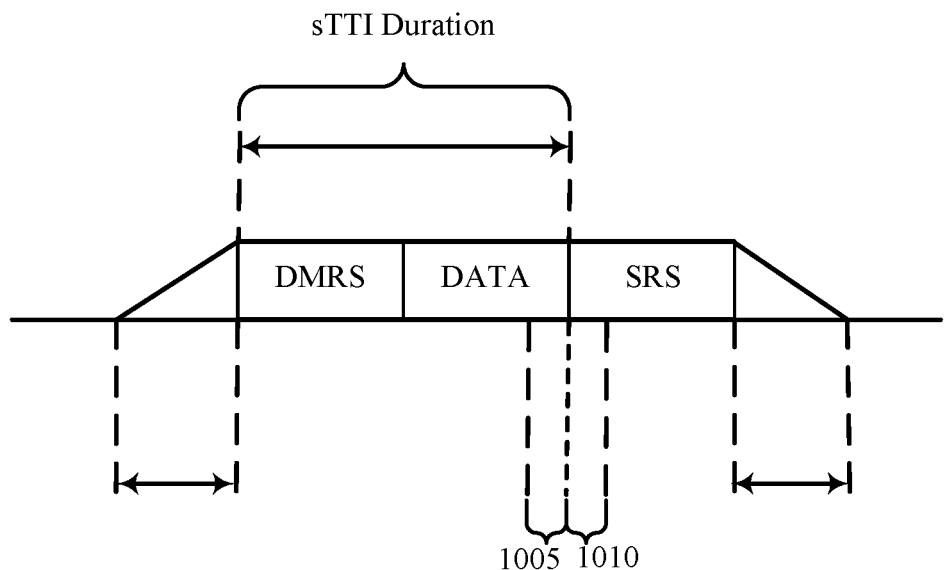

FIG. 10 illustrates an example of a time mask configuration 1000 that supports one or more aspects of the present disclosure. A UE 115 may be configured to dynamically select between this time mask configuration and other time mask configurations discussed herein based on a variety of factors (e.g., MCS of the data, periodicity of the SRS, etc.).

Time mask configuration 1000 resembles aspects of time mask configuration 900 described with reference to FIG. 9, except that the SRS region occurs after the DATA region in the present example (e.g., such that the SRS region and DATA region are still adjacent). Accordingly, first transient portion 1005 occurs within the DATA region and second transient portion 1010 occurs within the SRS region. For example, time mask configuration 1000 may be employed when the DMRS region is prioritized over the DATA region and SRS region, but there is no substantive prioritization between the DATA regions and SRS regions themselves. As described above, first and second transient portions 1005, 1010 may have the same duration; alternatively, some other suitable segmentation of the transient region may be employed (e.g., such that a region with a higher priority may have a correspondingly shorter transient portion).

Figure 11:
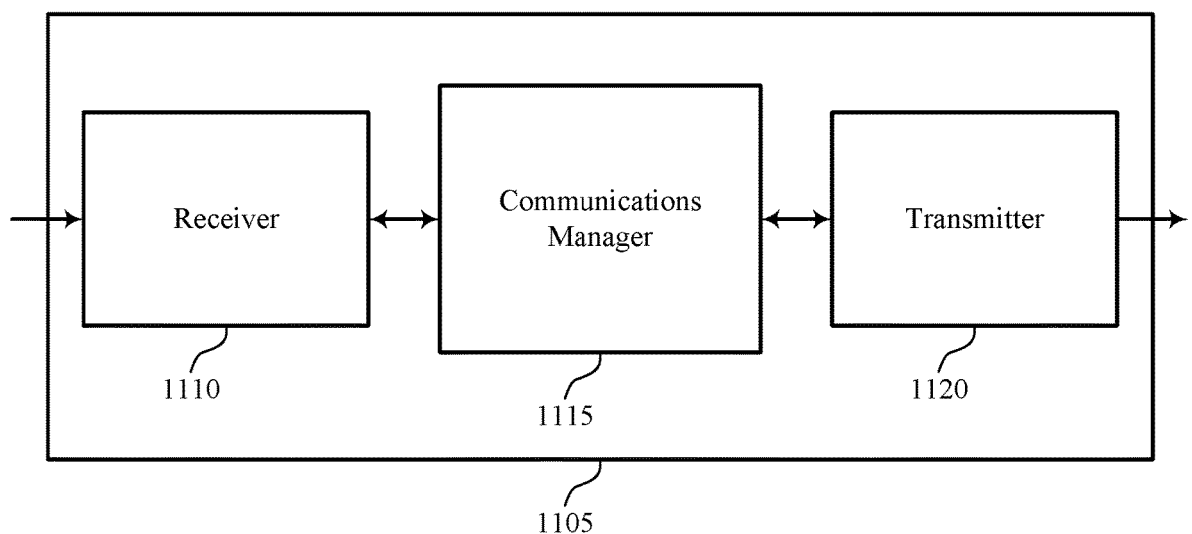
FIGS. 11 through 13 show block diagrams of a device that supports dynamic transient period configurations for sTTIs in accordance with one or more aspects of the present disclosure.

FIG. 11 shows a block diagram 1100 of a wireless device 1105 that supports dynamic transient period configurations for sTTIs in accordance with one or more aspects of the present disclosure. Wireless device 1105 may be an example of aspects of a UE 115 as described with reference to FIG. 1. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dynamic transient period configurations for sTTIs, etc.). Information may be passed on to other components of the device. The receiver 1110 may be an example of aspects of the transceiver 1435 described with reference to FIG. 14. The receiver 1110 may utilize a single antenna or a set of antennas.

Communications manager 1115 may be an example of aspects of the communications manager 1415 described with reference to FIG. 14. Communications manager 1115 and/or at least some of its various sub-components may be implemented in hardware, software executed by a processor, firmware, or any combination thereof. If implemented in software executed by a processor, the functions of the communications manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 1115 and/or at least some of its various sub-components may be physically located at various positions, including being distributed such that portions of functions are implemented at different physical locations by one or more physical devices. In some examples, communications manager 1115 and/or at least some of its various sub-components may be a separate and distinct component in accordance with various aspects of the present disclosure. In other examples, communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1115 may identify a resource grant for an uplink transmission, the uplink transmission including a first RS and a TTI that includes at least a second RS and data, and identify a type of the first RS, a type of the second RS, and a type of the data. In some cases, communications manager 1115 may determine a priority associated with the first RS, the second RS, and the data based on the type of the first RS, the type of the second RS, and the type of the data, dynamically configure a transient period that overlaps with the first RS, or the TTI, or both based on the determined priority, and transmit the uplink transmission including the configured transient period.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
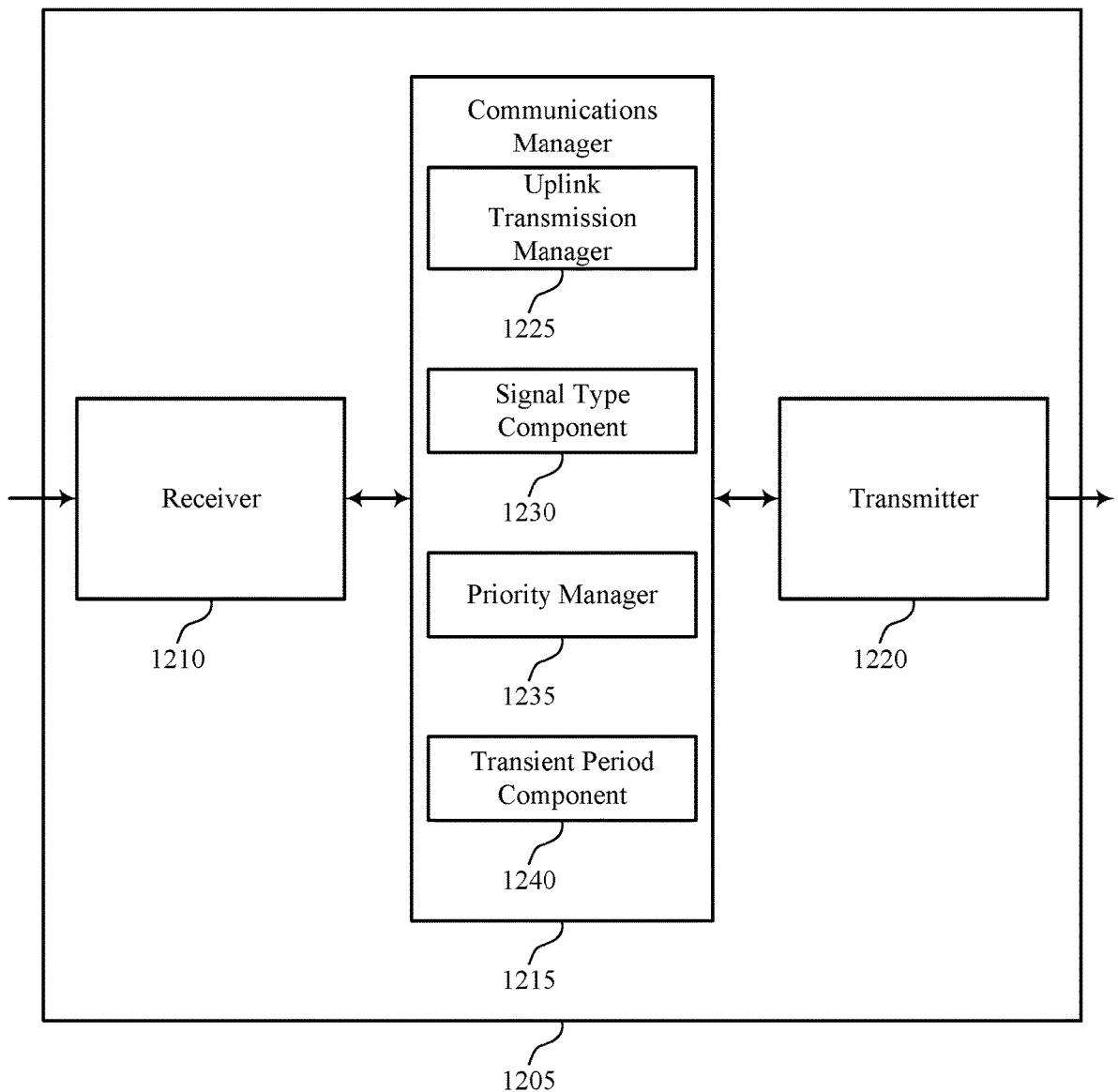

FIG. 12 shows a block diagram 1200 of a wireless device 1205 that supports dynamic transient period configurations for sTTIs in accordance with one or more aspects of the present disclosure. Wireless device 1205 may be an example of aspects of a wireless device 1105 or a UE 115 as described with reference to FIGS. 1 and 11. Wireless device 1205 may include receiver 1210, communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to dynamic transient period configurations for sTTIs, etc.). Information may be passed on to other components of the device. The receiver 1210 may be an example of aspects of the transceiver 1435 described with reference to FIG. 14. The receiver 1210 may utilize a single antenna or a set of antennas.

Communications manager 1215 may be an example of aspects of the communications manager 1415 described with reference to FIG. 14. Communications manager 1215 may also include uplink transmission manager 1225, signal type component 1230, priority manager 1235, and transient period component 1240.

Uplink transmission manager 1225 may identify a resource grant for an uplink transmission, the uplink transmission including a first RS and a TTI that includes at least a second RS and data and transmit the uplink transmission including the configured transient period. In some cases, the TTI or the first RS are associated with another wireless device. In some cases, the first RS includes an SRS. In some cases, the second RS includes a DMRS.

Signal type component 1230 may identify a type of the first RS, a type of the second RS, and a type of the data. For instance, signal type component 1230 may determine a content of these signals to identify the type. In some cases, the content of the data includes an acknowledgment or a negative acknowledgment. Priority manager 1235 may determine a priority associated with the first RS, the second RS, and the data based on the type of the first RS, the type of the second RS, and the type of the data. Transient period component 1240 may dynamically configure a transient period that overlaps with the first RS, or the TTI, or both based on the determined priority.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
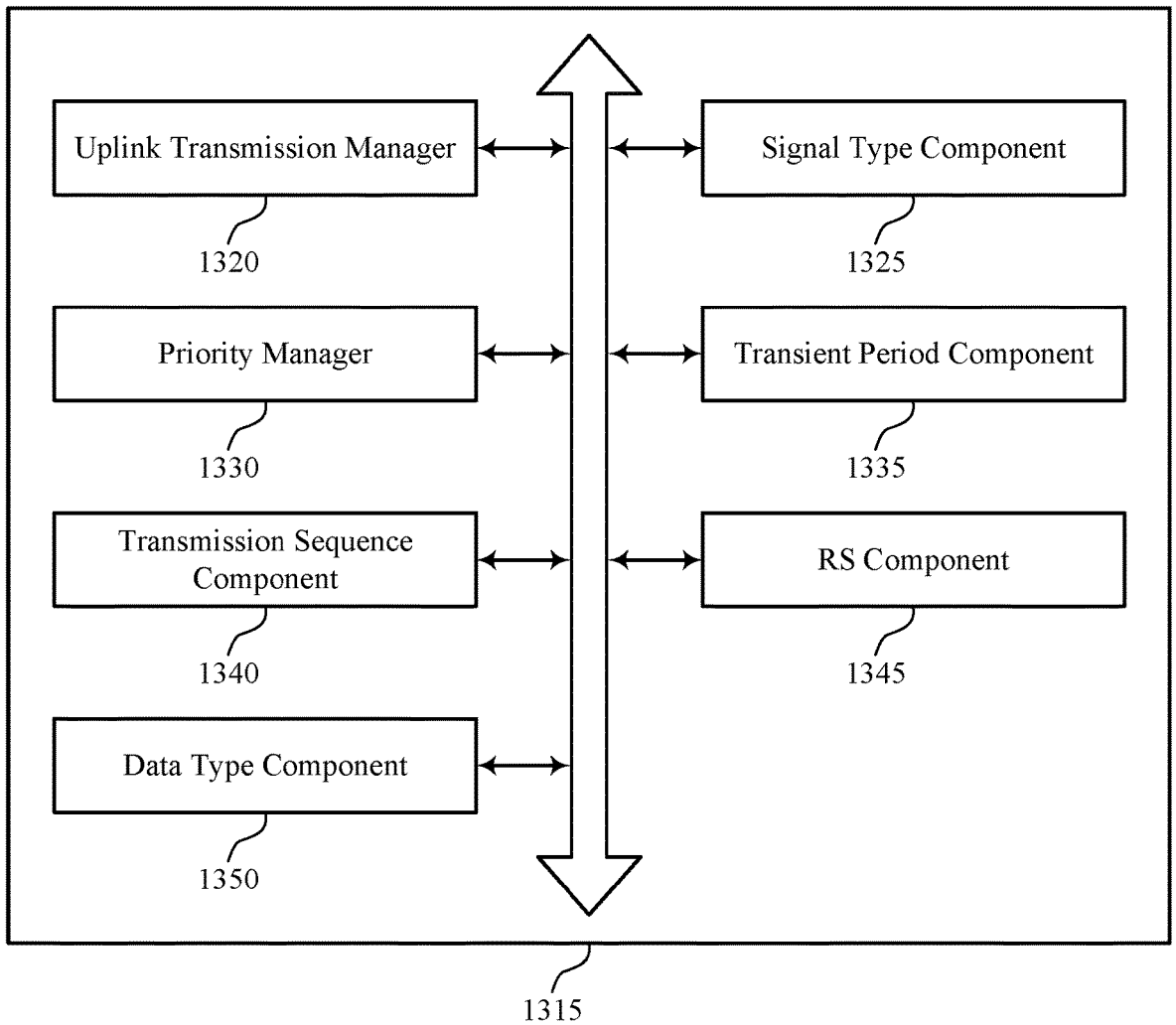

FIG. 13 shows a block diagram 1300 of a communications manager 1315 that supports dynamic transient period configurations for sTTIs in accordance with one or more aspects of the present disclosure. The communications manager 1315 may be an example of aspects of a communications manager 1115, a communications manager 1215, or a communications manager 1415 described with reference to FIGS. 11, 12, and 14. The communications manager 1315 may include uplink transmission manager 1320, signal type component 1325, priority manager 1330, transient period component 1335, transmission sequence component 1340, RS component 1345, and data type component 1350. Each of these modules may communicate, directly or indirectly, with one another (e.g., via one or more buses).

Uplink transmission manager 1320 may identify a resource grant for an uplink transmission, the uplink transmission including a first RS and a TTI that includes at least a second RS and data and transmit the uplink transmission including the configured transient period. In some cases, the TTI or the first RS are associated with another wireless device. In some cases, the first RS includes an SRS. In some cases, the second RS includes a DMRS.

Signal type component 1325 may identify a type of the first RS, a type of the second RS, and a type of the data. In some cases, the content of the data includes an acknowledgment or a negative acknowledgment. Priority manager 1330 may determine a priority associated with the first RS, the second RS, and the data based on the type of the first RS, the type of the second RS, and the type of the data. Transient period component 1335 may dynamically configure a transient period that overlaps with the first RS, or the TTI, or both based on the determined priority.

Transmission sequence component 1340 may determine that the first RS is adjacent to the second RS within the uplink transmission, where the transient period is configured to overlap with the first RS, the second RS, or both based on the determination that the first RS is adjacent to the second RS. For example, transmission sequence component 1340 may determine that the first RS is adjacent to the second RS within the uplink transmission, and the transient period may be configured to overlap with the first RS and the second RS based on the determination that the first RS is adjacent to the second RS. Additionally or alternatively, the transient period may be configured to overlap with the second RS based on the determination that the first RS is adjacent to the second RS.

In some examples, transmission sequence component 1340 may determine that the first RS is adjacent to the data of the TTI within the uplink transmission, where the transient period is configured to overlap with the first RS, the data, or both based on the determination that the first RS is adjacent to the data. For instance, transmission sequence component 1340 may determine that the first RS is adjacent to the data of the TTI within the uplink transmission and the transient period may be configured to overlap with the data based on the determination that the first RS is adjacent to the data. In other examples, the transient period may be configured to overlap with the first RS based at least in part on the determination that the first RS is adjacent to the data. RS component 1345 may identify a periodicity of the RS based on an uplink configuration of the uplink transmission. Data type component 1350 may identify an MCS associated with the data, or a content of the data, or both. In some example, the content of the data may include an ACK/NACK for a HARQ process.

Figure 14:
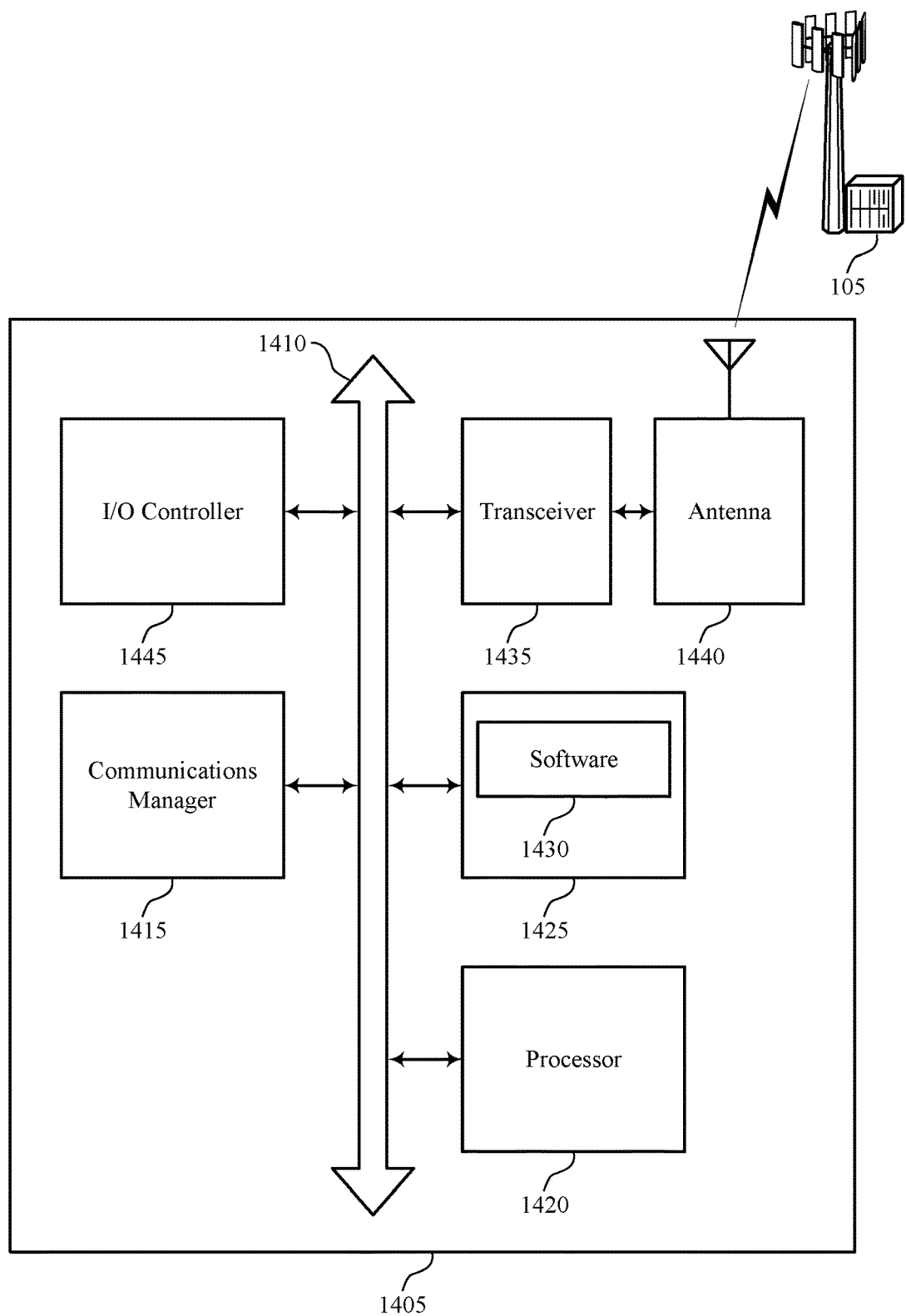
FIG. 14 illustrates a block diagram of a system including a UE that supports dynamic transient period configurations for sTTIs in accordance with one or more aspects of the present disclosure.

FIG. 14 shows a diagram of a system 1400 including a device 1405 that supports dynamic transient period configurations for sTTIs in accordance with one or more aspects of the present disclosure. Device 1405 may be an example of or include the components of wireless device 1105, wireless device 1205, or a UE 115 as described above, e.g., with reference to FIGS. 1, 11 and 12. Device 1405 may include components for bi-directional voice and data communications including components for transmitting and receiving communications, including communications manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting dynamic transient period configurations for sTTIs).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware and/or software operation such as the interaction with peripheral components or devices.

Software 1430 may include code to implement aspects of the present disclosure, including code to support dynamic transient period configurations for sTTIs. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
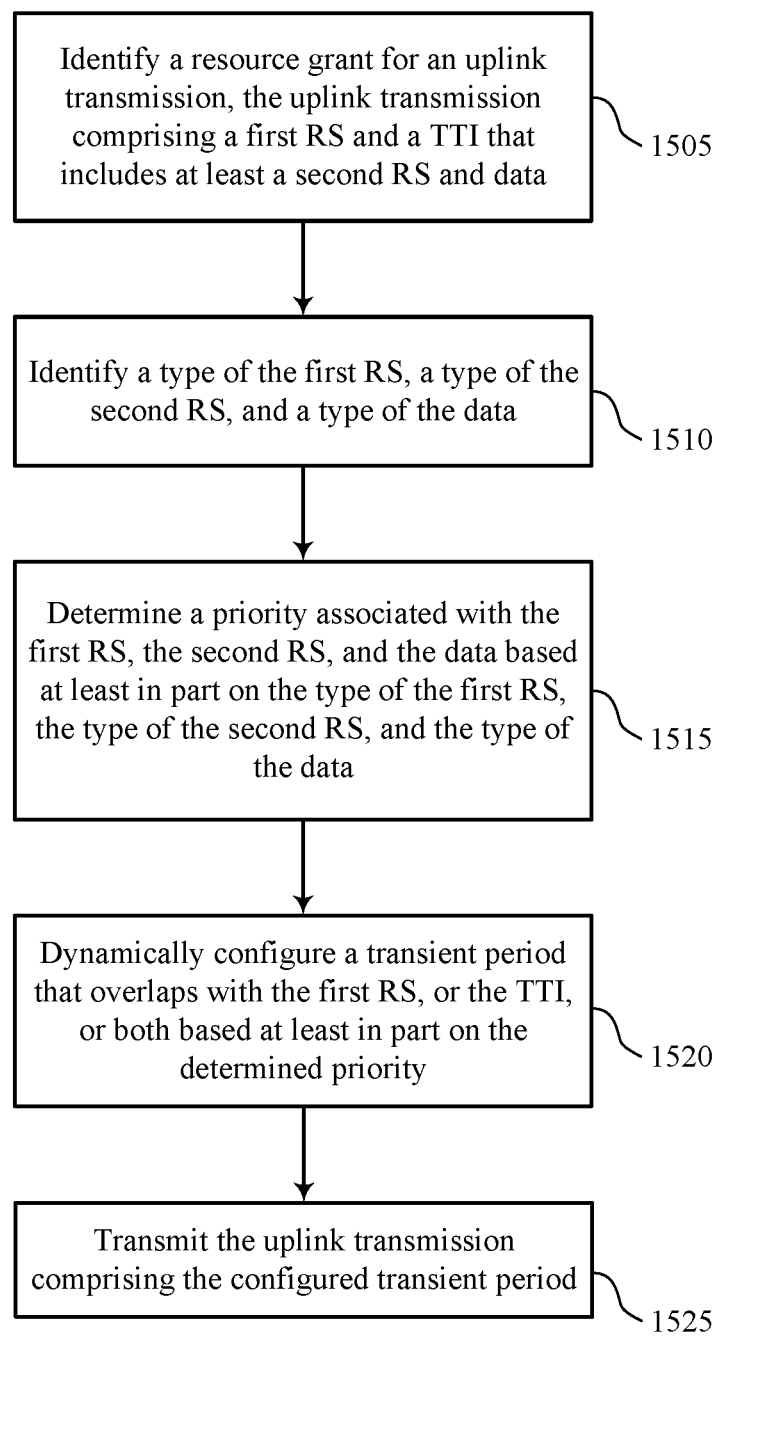
FIGS. 15 through 17 illustrate methods for dynamic transient period configurations for sTTIs in accordance with one or more aspects of the present disclosure.

FIG. 15 shows a flowchart illustrating a method 1500 for dynamic transient period configurations for sTTIs in accordance with one or more aspects of the present disclosure. The operations of method 1500 may be implemented by a UE 115 or its components as described herein. For example, the operations of method 1500 may be performed by a communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a resource grant for an uplink transmission, the uplink transmission comprising a first RS and a TTI that includes at least a second RS and data. The operations of 1505 may be performed according to the methods described with reference to FIGS. 1 through 10. In certain examples, aspects of the operations of 1505 may be performed by an uplink transmission manager as described with reference to FIGS. 11 through 14.

At 1510 the UE 115 may identify a type of the first RS, a type of the second RS, and a type of the data. The operations of 1510 may be performed according to the methods described with reference to FIGS. 1 through 10. In certain examples, aspects of the operations of 1510 may be performed by a signal type component as described with reference to FIGS. 11 through 14.

At 1515 the UE 115 may determine a priority associated with the first RS, the second RS, and the data based at least in part on the type of the first RS, the type of the second RS, and the type of the data. The operations of 1515 may be performed according to the methods described with reference to FIGS. 1 through 10. In certain examples, aspects of the operations of 1515 may be performed by a priority manager as described with reference to FIGS. 11 through 14.

At 1520 the UE 115 may dynamically configure a transient period that overlaps with the first RS, or the TTI, or both based at least in part on the determined priority. The operations of 1520 may be performed according to the methods described with reference to FIGS. 1 through 10. In certain examples, aspects of the operations of 1520 may be performed by a transient period component as described with reference to FIGS. 11 through 14.

At 1525 the UE 115 may transmit the uplink transmission comprising the configured transient period. The operations of 1525 may be performed according to the methods described with reference to FIGS. 1 through 10. In certain examples, aspects of the operations of 1525 may be performed by an uplink transmission manager as described with reference to FIGS. 11 through 14.

Figure 16:
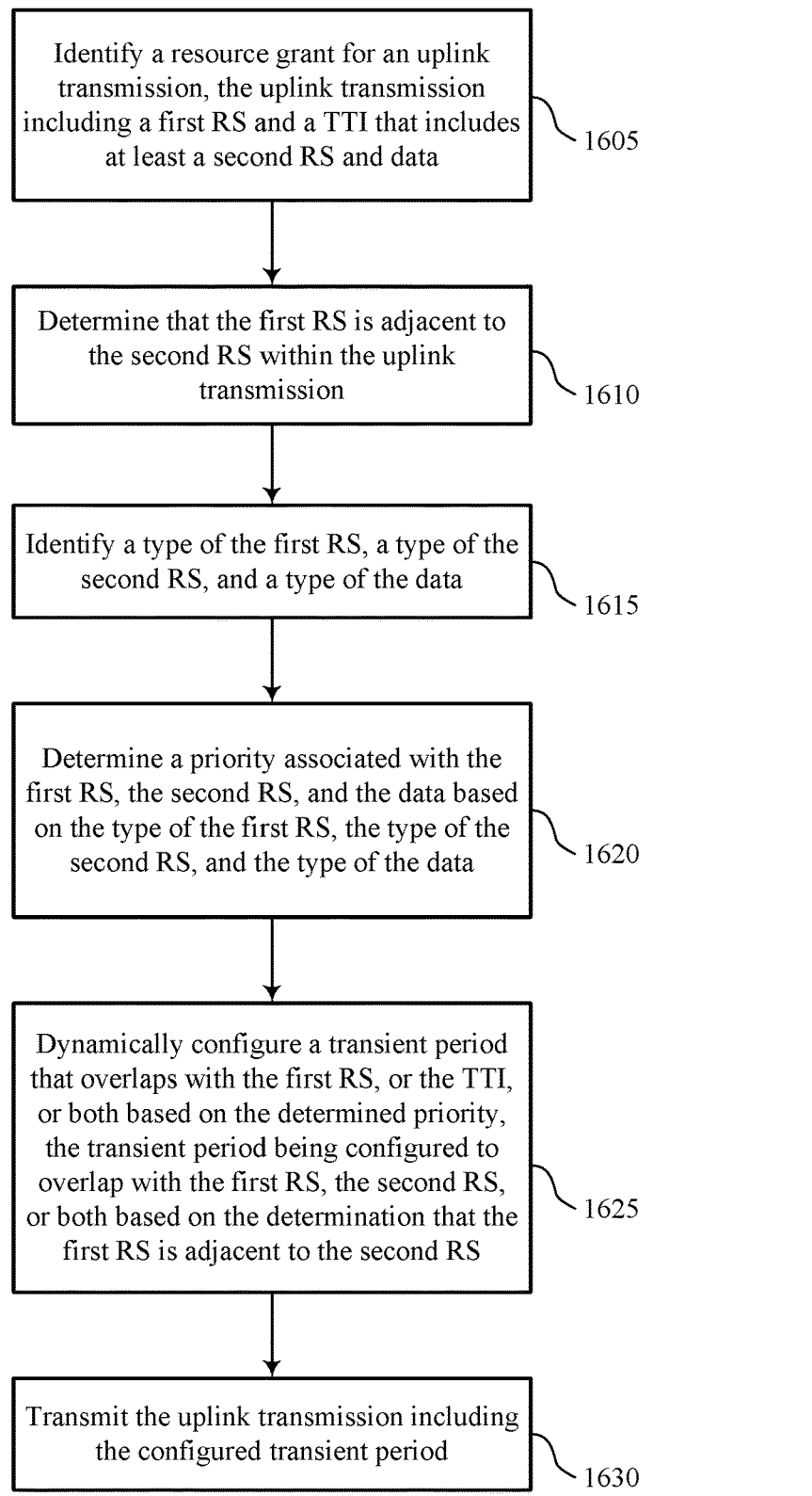

FIG. 16 shows a flowchart illustrating a method 1600 for dynamic transient period configurations for sTTIs in accordance with one or more aspects of the present disclosure. The operations of method 1600 may be implemented by a UE 115 or its components as described herein. For example, the operations of method 1600 may be performed by a communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may identify a resource grant for an uplink transmission, the uplink transmission comprising a first RS and a TTI that includes at least a second RS and data. The operations of 1605 may be performed according to the methods described with reference to FIGS. 1 through 10. In certain examples, aspects of the operations of 1605 may be performed by an uplink transmission manager as described with reference to FIGS. 11 through 14.

At 1610 the UE 115 may determine that the first RS is adjacent to the second RS within the uplink transmission. The operations of 1610 may be performed according to the methods described with reference to FIGS. 1 through 10. In certain examples, aspects of the operations of 1610 may be performed by a transmission sequence component as described with reference to FIGS. 11 through 14.

At 1615 the UE 115 may identify a type of the first RS, a type of the second RS, and a type of the data. The operations of 1615 may be performed according to the methods described with reference to FIGS. 1 through 10. In certain examples, aspects of the operations of 1615 may be performed by a signal type component as described with reference to FIGS. 11 through 14.

At 1620 the UE 115 may determine a priority associated with the first RS, the second RS, and the data based at least in part on the type of the first RS, the type of the second RS, and the type of the data. The operations of 1620 may be performed according to the methods described with reference to FIGS. 1 through 10. In certain examples, aspects of the operations of 1620 may be performed by a priority manager as described with reference to FIGS. 11 through 14.

At 1625 the UE 115 may dynamically configure a transient period that overlaps with the first RS, or the TTI, or both based at least in part on the determined priority. In some cases, the transient period may be configured to overlap with the first RS, the second RS, or both based at least in part on the determination that the first RS is adjacent to the second RS. The operations of 1625 may be performed according to the methods described with reference to FIGS. 1 through 10. In certain examples, aspects of the operations of 1625 may be performed by a transient period component as described with reference to FIGS. 11 through 14.

At 1630 the UE 115 may transmit the uplink transmission comprising the configured transient period. The operations of 1630 may be performed according to the methods described with reference to FIGS. 1 through 10. In certain examples, aspects of the operations of 1630 may be performed by an uplink transmission manager as described with reference to FIGS. 11 through 14.

Figure 17:
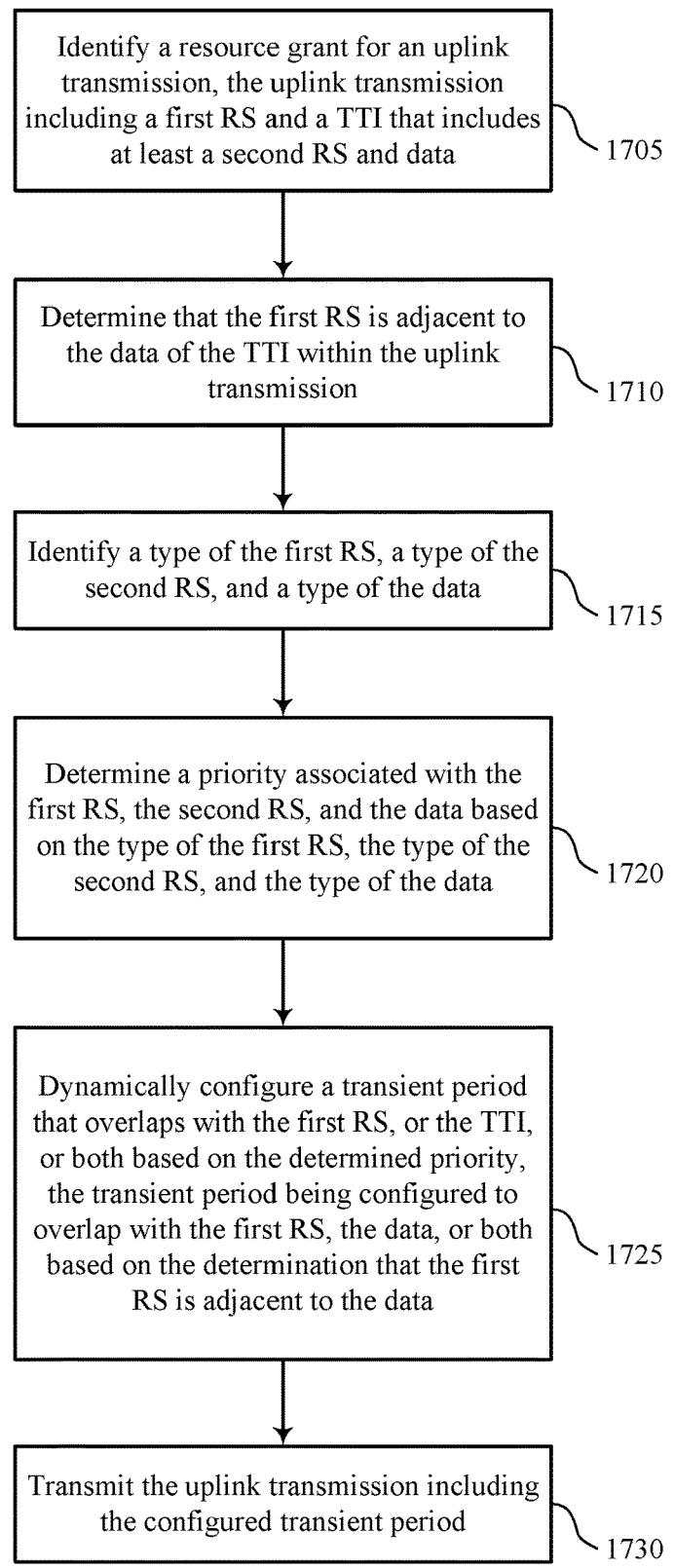

FIG. 17 shows a flowchart illustrating a method 1700 for dynamic transient period configurations for sTTIs in accordance with one or more aspects of the present disclosure. The operations of method 1700 may be implemented by a UE 115 or its components as described herein. For example, the operations of method 1700 may be performed by a communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may identify a resource grant for an uplink transmission, the uplink transmission comprising a first RS and a TTI that includes at least a second RS and data. The operations of 1705 may be performed according to the methods described with reference to FIGS. 1 through 10. In certain examples, aspects of the operations of 1705 may be performed by an uplink transmission manager as described with reference to FIGS. 11 through 14.

At 1710 the UE 115 may determine that the first RS is adjacent to the data of the TTI within the uplink transmission. The operations of 1710 may be performed according to the methods described with reference to FIGS. 1 through 10. In certain examples, aspects of the operations of 1710 may be performed by a transmission sequence component as described with reference to FIGS. 11 through 14.

At 1715 the UE 115 may identify a type of the first RS, a type of the second RS, and a type of the data. The operations of 1715 may be performed according to the methods described with reference to FIGS. 1 through 10. In certain examples, aspects of the operations of 1715 may be performed by a signal type component as described with reference to FIGS. 11 through 14.

At 1720 the UE 115 may determine a priority associated with the first RS, the second RS, and the data based at least in part on the type of the first RS, the type of the second RS, and the type of the data. The operations of 1720 may be performed according to the methods described with reference to FIGS. 1 through 10. In certain examples, aspects of the operations of 1720 may be performed by a priority manager as described with reference to FIGS. 11 through 14.

At 1725 the UE 115 may dynamically configure a transient period that overlaps with the first RS, or the TTI, or both based at least in part on the determined priority. In some examples, the transient period may be configured to overlap with the first RS, the data, or both based at least in part on the determination that the first RS is adjacent to the data. The operations of 1725 may be performed according to the methods described with reference to FIGS. 1 through 10. In certain examples, aspects of the operations of 1725 may be performed by a transient period component as described with reference to FIGS. 11 through 14.

At 1730 the UE 115 may transmit the uplink transmission comprising the configured transient period. The operations of 1730 may be performed according to the methods described with reference to FIGS. 1 through 10. In certain examples, aspects of the operations of 1730 may be performed by an uplink transmission manager as described with reference to FIGS. 11 through 14.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   identifying a resource grant for an uplink transmission, the uplink transmission comprising a first reference signal (RS) and a transmission time interval (TTI) that includes at least a second reference signal (RS) and data;
   identifying a type of the first RS, a type of the second RS, and a type of the data;
   determining a respective priority associated with each of the first RS, the second RS, and the data, the respective priorities being based at least in part on the type of the first RS, the type of the second RS, and the type of the data;
   dynamically configuring a transient period that overlaps with the first RS, or the TTI, or both the first RS and the TTI based at least in part on the respective priorities; and
   transmitting the uplink transmission comprising the configured transient period.

2. The method of claim 1, further comprising:
   determining that the first RS is adjacent to the second RS within the uplink transmission.

3. The method of claim 2, wherein the transient period is configured to overlap with the first RS and the second RS based at least in part on the determination that the first RS is adjacent to the second RS.

4. The method of claim 2, wherein the transient period is configured to overlap with the second RS based at least in part on the determination that the first RS is adjacent to the second RS.

5. The method of claim 1, further comprising:
   determining that the first RS is adjacent to the data of the TTI within the uplink transmission.

6. The method of claim 5, wherein the transient period is configured to overlap with the data based at least in part on the determination that the first RS is adjacent to the data.

7. The method of claim 5, wherein the transient period is configured to overlap with the first RS based at least in part on the determination that the first RS is adjacent to the data.

8. The method of claim 5, wherein the transient period is configured to overlap with the first RS and the data based at least in part on the determination that the first RS is adjacent to the data.

9. The method of claim 1, wherein identifying the type of the first RS comprises:
identifying a periodicity of the first RS based at least in part on an uplink configuration of the uplink transmission.

10. The method of claim 1, wherein identifying the type of the data comprises:
identifying a modulation and coding scheme (MCS) associated with the data, or a content of the data, or both.

11. The method of claim 10, wherein the content of the data comprises an acknowledgment or a negative acknowledgment.

12. The method of claim 1, wherein the TTI or the first RS are associated with another wireless device, and wherein the transient period is dynamically configured based at least in part on the TTI or the first RS being associated with another wireless device.

13. The method of claim 1, wherein the first RS comprises a sounding reference signal (SRS).

14. The method of claim 1, wherein the second RS comprises a demodulation reference signal (DMRS).

15. The method of claim 1, wherein the first RS comprises a sounding reference signal (SRS) and the second RS comprises a demodulation reference signal (DMRS).

16. An apparatus for wireless communication at a wireless device, comprising:
means for identifying a resource grant for an uplink transmission, the uplink transmission comprising a first reference signal (RS) and a transmission time interval (TTI) that includes at least a second reference signal (RS) and data;
means for identifying a type of the first RS, a type of the second RS, and a type of the data;
means for determining a respective priority associated with each of the first RS, the second RS, and the data, the respective priorities being based at least in part on the type of the first RS, the type of the second RS, and the type of the data;
means for dynamically configuring a transient period that overlaps with the first RS, or the TTI, or both the first RS and the TTI based at least in part on the respective priorities; and
means for transmitting the uplink transmission comprising the configured transient period.

17. The apparatus of claim 15, further comprising:
means for determining that the first RS is adjacent to the second RS within the uplink transmission.

18. The apparatus of claim 16, wherein the transient period is configured to overlap with the first RS and the second RS based at least in part on the determination that the first RS is adjacent to the second RS.

19. The apparatus of claim 16, wherein the transient period is configured to overlap with the second RS based at least in part on the determination that the first RS is adjacent to the second RS.

20. The apparatus of claim 15, further comprising:
means for determining that the first RS is adjacent to the data of the TTI within the uplink transmission.

21. The apparatus of claim 19, wherein the transient period is configured to overlap with the data based at least in part on the determination that the first RS is adjacent to the data.

22. The apparatus of claim 19, wherein the transient period is configured to overlap with the first RS based at least in part on the determination that the first RS is adjacent to the data.

23. The apparatus of claim 19, wherein the transient period is configured to overlap with the first RS and the data based at least in part on the determination that the first RS is adjacent to the data.

24. The apparatus of claim 15, wherein the means for identifying the type of the first RS comprises:
means for identifying a periodicity of the first RS based at least in part on an uplink configuration of the uplink transmission.

25. The apparatus of claim 15, wherein the means for identifying the type of the data comprises:
means for identifying a modulation and coding scheme (MCS) associated with the data, or a content of the data, or both.

26. The apparatus of claim 24, wherein the content of the data comprises an acknowledgment or a negative acknowledgment.

27. The apparatus of claim 15, wherein the TTI or the first RS are associated with another wireless device, and wherein the transient period is dynamically configured based at least in part on the TTI or the first RS being associated with another wireless device.

28. The apparatus of claim 15, wherein the first RS comprises a sounding reference signal (SRS).

29. The apparatus of claim 15, wherein the second RS comprises a demodulation reference signal (DMRS).

30. The apparatus of claim 16, wherein the first RS comprises a sounding reference signal (SRS) and the second RS comprises a demodulation reference signal (DMRS).

31. An apparatus for wireless communication at a wireless device, comprising:
a processor;
memory coupled with the processor; and
the processor and memory configured to:
identify a resource grant for an uplink transmission, the uplink transmission comprising a first reference signal (RS) and a transmission time interval (TTI) that includes at least a second reference signal (RS) and data;
identify a type of the first RS, a type of the second RS, and a type of the data;
determine a respective priority associated with each of the first RS, the second RS, and the data, the respective priorities being based at least in part on the type of the first RS, the type of the second RS, and the type of the data;
dynamically configure a transient period that overlaps with the first RS, or the TTI, or both the first RS and the TTI based at least in part on the respective priorities; and
transmit the uplink transmission comprising the configured transient period.

32. The apparatus of claim 29, wherein the processor and memory are configured to:
determine that the first RS is adjacent to the second RS within the uplink transmission.

33. The apparatus of claim 30, wherein the transient period is configured to overlap with the first RS and the second RS based at least in part on the determination that the first RS is adjacent to the second RS.

34. The apparatus of claim 30, wherein the transient period is configured to overlap with the second RS based at least in part on the determination that the first RS is adjacent to the second RS.

35. The apparatus of claim 29, wherein the processor and memory are configured to:
   determine that the first RS is adjacent to the data of the TTI within the uplink transmission.

36. The apparatus of claim 33, wherein the transient period is configured to overlap with the data based at least in part on the determination that the first RS is adjacent to the data.

37. The apparatus of claim 33, wherein the transient period is configured to overlap with the first RS based at least in part on the determination that the first RS is adjacent to the data.

38. The apparatus of claim 33, wherein the transient period is configured to overlap with the first RS and the data based at least in part on the determination that the first RS is adjacent to the data.

39. The apparatus of claim 29, wherein the processor and memory configured to identify the type of the first RS comprises the processor and memory configured to:
   identify a periodicity of the first RS based at least in part on an uplink configuration of the uplink transmission.

40. The apparatus of claim 29, wherein the processor and memory configured to identify the type of the data comprises the processor and memory configured to:
   identify a modulation and coding scheme (MCS) associated with the data, or a content of the data, or both.

41. The apparatus of claim 38, wherein the content of the data comprises an acknowledgment or a negative acknowledgment.

42. The apparatus of claim 29, wherein the TTI or the first RS are associated with another wireless device, and wherein the transient period is dynamically configured based at least in part on the TTI or the first RS being associated with another wireless device.

43. The apparatus of claim 29, wherein the first RS comprises a sounding reference signal (SRS).

44. The apparatus of claim 29, wherein the second RS comprises a demodulation reference signal (DMRS).

45. The apparatus of claim 31, wherein the first RS comprises a sounding reference signal (SRS) and the second RS comprises a demodulation reference signal (DMRS).

46. A non-transitory computer-readable medium storing code for wireless communication at a wireless device, the code comprising instructions executable by a processor to:
   identify a resource grant for an uplink transmission, the uplink transmission comprising a first reference signal (RS) and a transmission time interval (TTI) that includes at least a second reference signal (RS) and data;
   identify a type of the first RS, a type of the second RS, and a type of the data;
   determine a respective priority associated with each of the first RS, the second RS, and the data, the respective priorities being based at least in part on the type of the first RS, the type of the second RS, and the type of the data;
   dynamically configure a transient period that overlaps with the first RS, or the TTI, or both the first RS and the TTI based at least in part on the respective priorities; and
   transmit the uplink transmission comprising the configured transient period.

47. The non-transitory computer-readable medium of claim 46, wherein the code further comprises instructions executable by the processor to:
   determine that the first RS is adjacent to the second RS within the uplink transmission.

48. The non-transitory computer-readable medium of claim 47, wherein the transient period is configured to overlap with the second RS based at least in part on the determination that the first RS is adjacent to the second RS.

49. The non-transitory computer-readable medium of claim 46, wherein the code further comprises instructions executable by the processor to:
   determining that the first RS is adjacent to the data of the TTI within the uplink transmission.

50. The non-transitory computer-readable medium of claim 46, wherein the first RS comprises a sounding reference signal (SRS).

51. The non-transitory computer-readable medium of claim 46, wherein the second RS comprises a demodulation reference signal (DMRS).

52. The non-transitory computer-readable medium of claim 46, wherein the first RS comprises a sounding reference signal (SRS) and the second RS comprises a demodulation reference signal (DMRS).

53. A method for wireless communication of an uplink transmission, the uplink transmission including a sounding reference signal (SRS) and a transmission time interval (TTI), the TTI including data and a demodulation reference signal (DMRS), the method comprising:
   based at least in part on a timing of the SRS being adjacent to a timing of the data of the TTI, configuring a transient period that overlaps with the SRS and the TTI; and transmitting the uplink transmission comprising the configured transient period.

* * * * *